(12) United States Patent
Meteer et al.

(10) Patent No.: US 11,568,231 B2
(45) Date of Patent: Jan. 31, 2023

(54) WAYPOINT DETECTION FOR A CONTACT CENTER ANALYSIS SYSTEM

(71) Applicant: Raytheon BBN Technologies Corp., Cambridge, MA (US)

(72) Inventors: Marie Wenzel Meteer, Arlington, MA (US); Patrick Mangan Peterson, Cambridge, MA (US)

(73) Assignee: Raytheon BBN Technologies Corp., Cambridge, MA (US)

( * ) Notice: Subject to any disclaimer, the term of this patent is extended or adjusted under 35 U.S.C. 154(b) by 979 days.

(21) Appl. No.: 15/836,102

(22) Filed: Dec. 8, 2017

(65) Prior Publication Data
US 2019/0180175 A1 Jun. 13, 2019

(51) Int. Cl.
*G06N 3/08* (2006.01)
*G06K 9/62* (2022.01)
(Continued)

(52) U.S. Cl.
CPC .......... *G06N 3/08* (2013.01); *G06F 3/04812* (2013.01); *G06F 9/451* (2018.02); *G06F 40/284* (2020.01);
(Continued)

(58) Field of Classification Search
CPC . G06N 3/08; G06N 20/00; G06N 5/04; G06F 9/451; G06F 40/284; G06F 40/289;
(Continued)

(56) References Cited

U.S. PATENT DOCUMENTS

| 8,102,973 B2 | 1/2012 | Peterson |
| 8,504,369 B1 * | 8/2013 | Chigier ................... G10L 15/26 704/270 |

(Continued)

OTHER PUBLICATIONS

Basu et al., "Semi-supervised Clustering by Seeding," Proceedings of the 19th International Conference on Machine Learning (ICML-2002), pp. 19-26, Sydney, Australia, Jul. 2002 (Year: 2002).*

(Continued)

*Primary Examiner* — Miranda M Huang
*Assistant Examiner* — Yao David Huang
(74) *Attorney, Agent, or Firm* — Schwegman Lundberg & Woessner, P.A.

(57) ABSTRACT

A contact center analysis system can receive various types of communications from customers, such as audio from telephone calls, voicemails, or video conferences; text from speech-to-text translations, emails, live chat transcripts, text messages, and the like; and other media or multimedia. The system can segment the communication data using temporal, lexical, semantic, syntactic, prosodic, user, and/or other features of the segments. The system can cluster the segments according to one or more similarity measures of the segments. The system can use the clusters to train a machine learning classifier to identify one or more of the clusters as waypoints (e.g., portions of the communications of particular relevance to a user training the classifier). The system can automatically classify new communications using the classifier and facilitate various analyses of the communications using the waypoints.

19 Claims, 10 Drawing Sheets

(51) Int. Cl.

| | | |
|---|---|---|
| *G06N 5/04* | (2006.01) | |
| *G06F 3/04812* | (2022.01) | |
| *G10L 15/18* | (2013.01) | |
| *G10L 15/26* | (2006.01) | |
| *G06F 9/451* | (2018.01) | |
| *G06N 20/00* | (2019.01) | |
| *G10L 15/00* | (2013.01) | |
| *G06F 40/30* | (2020.01) | |
| *G06F 40/284* | (2020.01) | |
| *G06F 40/289* | (2020.01) | |

(52) U.S. Cl.
CPC ............ *G06F 40/289* (2020.01); *G06F 40/30* (2020.01); *G06K 9/6218* (2013.01); *G06K 9/6276* (2013.01); *G06N 5/04* (2013.01); *G06N 20/00* (2019.01); *G10L 15/00* (2013.01); *G10L 15/1807* (2013.01); *G10L 15/26* (2013.01)

(58) Field of Classification Search
CPC ... G06F 40/30; G06F 3/04812; G06K 9/6218; G06K 9/6276; G10L 15/00; G10L 15/1807; G10L 15/26
See application file for complete search history.

(56) References Cited

U.S. PATENT DOCUMENTS

| | | | | |
|---|---|---|---|---|
| 8,515,736 | B1 * | 8/2013 | Duta | H04M 3/5232 |
| | | | | 704/9 |
| 8,761,373 | B1 * | 6/2014 | Raghavan | H04M 3/4936 |
| | | | | 379/265.03 |
| 8,885,798 | B2 | 11/2014 | Peterson | |
| 9,407,764 | B2 | 8/2016 | Peterson | |
| 10,540,610 | B1 * | 1/2020 | Yang | G06N 20/00 |
| 2004/0024585 | A1 * | 2/2004 | Srivastava | G10L 25/78 |
| | | | | 704/10 |
| 2004/0024598 | A1 * | 2/2004 | Srivastava | G10L 15/26 |
| | | | | 704/235 |
| 2012/0173229 | A1 * | 7/2012 | Peterson | H04M 3/5191 |
| | | | | 704/200 |
| 2013/0325759 | A1 * | 12/2013 | Rachevsky | G06K 9/6232 |
| | | | | 706/12 |
| 2014/0006020 | A1 * | 1/2014 | Ko | G06F 16/61 |
| | | | | 704/235 |
| 2014/0236580 | A1 * | 8/2014 | Peters | G06F 40/279 |
| | | | | 704/9 |
| 2016/0063993 | A1 * | 3/2016 | Dolan | G06F 40/279 |
| | | | | 704/254 |
| 2019/0164054 | A1 * | 5/2019 | Lee | G06V 10/7753 |

OTHER PUBLICATIONS

Suhm, Bernhard, et al., "Call Browser: A System to Improve the Caller Experience by Analyzing Live Calls End-to-End." CHI 2009, Apr. 3-9, 2009, Boston, MA, USA. Retrieved from <https://www.es.brandeis.edu/~cs136a/CS136a_docs/Chi2009%20Suhm-Peterson.pdf> (Year: 2009).*

Ankerst et al., "OPTICS: Ordering Points To Identify the Clustering Structure," Proc. ACM SIGMOD'99 Int. Conf. on Management of Data, Philadelphia PA, 1999 (Year: 1999).*

* cited by examiner

WAYPOINT DETECTION FOR A CONTACT CENTER ANALYSIS SYSTEM

TECHNICAL FIELD

The present disclosure generally relates to the field of electronic communication processing for a contact center analysis system, and more particularly to systems and methods for automating segmentation and annotation of targeted portions of the electronic communications.

BACKGROUND

Many businesses and other organizations provide call centers in which customer service representatives (CSRs) field telephone calls from customers regarding information about products or services, orders for the products or services, account and payment information, customer feedback, and the like. These interactions between customers and a company's call center often form the most important impressions about the company in the minds of customers. Organizational success may depend on efficiently handling and diligently satisfying customer inquiries flowing through the call center. Improving call center performance can thus lead to greater retention of existing business and creation of new business opportunities through word of mouth and good will.

An initial step in improving the operations of a call center is determining how to evaluate the quality of CSRs' communications with customers. One difficulty in evaluating CSR performance is the scale or volume of communications between CSRs and customers, which can number in the thousands, millions, or greater per day for some companies. Automated tools can address some of the problems of scale but these tools are often limited to rudimentary analysis, such as time-to-answer, average call handle time, number of call drops, number of call-backs, and other easily quantifiable metrics. Successful interactions between CSRs and customers oftentimes depend on criteria that are not so easily identifiable and quantifiable. Another shortcoming of conventional call center management systems is their limited scope. Customers communicate with businesses using many different channels, such as emails, instant messages, Short Message Service (SMS) text messages, live chats, social network messages, voicemails, and videos, among other types of media, but conventional systems do not account for these various types of communications.

In addition to lacking breadth for failing to provide a more complete assessment of communications and for failing to support multiple channels of communications, conventional call center management systems can also suffer from lack of depth or detail. On occasions when an individual communication requires closer scrutiny, an administrator of the conventional system may have to review a substantial amount or the entirety of the communication. This problem is exacerbated when the administrator needs to analyze multiple communications along the same vein.

BRIEF DESCRIPTION OF THE DRAWINGS

The present disclosure will describe various embodiments with reference to the drawings, in which.

DETAILED DESCRIPTION

Figure 1:
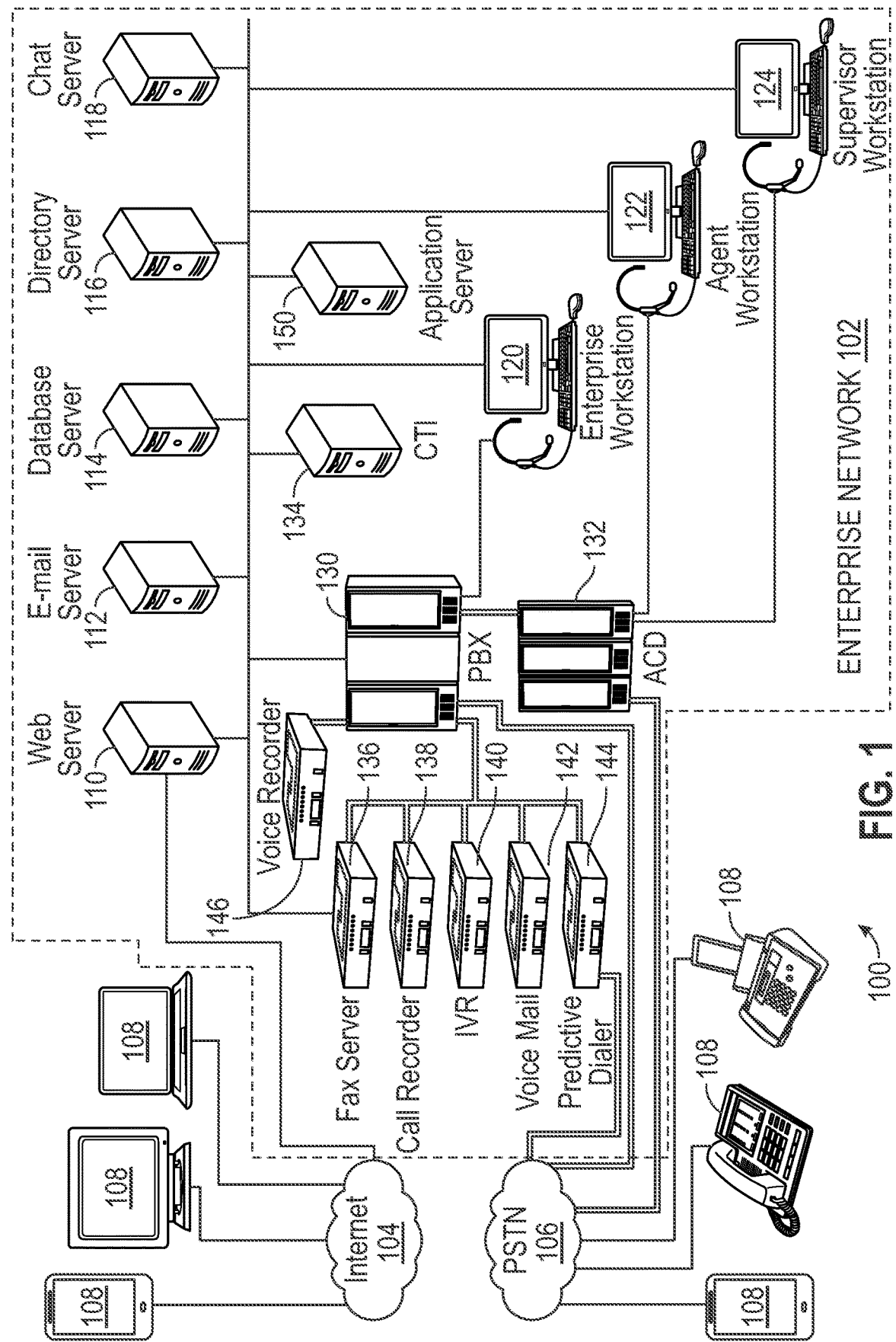
FIG. 1 illustrates a first example of a network environment in accordance with an embodiment.

Systems and methods in accordance with various embodiments of the present disclosure may overcome one or more of the aforementioned and other deficiencies experienced in conventional call center management systems. In some embodiments, a contact center analysis system can receive communication data, such as audio data from telephone calls, voicemails, or video conferences; text data from translations of speech in the audio data to text, emails, live chat transcripts, instant messages, SMS text messages, social network messages, and the like; combinations of text, video, audio, or other media (e.g., customer feedback precipitated by email that progresses to a telephone call); or other electronic communications.

In some embodiments, the contact center analysis system can segment the communication data according to the features of the communication data, such as temporal features (e.g., durations for segments of the communication data, idle time durations, timestamps, etc.); lexical features (e.g., keywords or phrases, whether word or phrase is a proper noun, statistical likelihood that a word/phrase is an initial token or final token of a segment, how words and phrases relate to one another); syntactic features (e.g., part of speech (POS) and sequence of the word or phrase in a segment; punctuation, capitalization, formatting (for text); etc.); audio or prosodic features (e.g., pitch (fundamental frequency), loudness (energy), meter (pauses or phonetic durations), etc.) (for speech); user features (e.g., identity of the user associated with particular segments of the communication); and other characteristics of the communication data.

In some embodiments, the contact center analysis system can evaluate the similarity of the segments to identify clusters or groupings of segments that are more similar (or depending on the metric used, less distant, denser, or otherwise more related to one another than other clusters). The contact center analysis system can use various similarity measures, such as character-based measures (e.g., Longest Common Substring (LCS), Damerau-Levenshtein, Jaro, Needleman-Wunsch, Smith-Waterman, N-gram, etc.); term-based measures (e.g., Euclidean distance, Manhattan distance, cosine similarity, Jaccard similarity, matching coefficient, etc.); corpus-based measures (e.g., Hyperspace Analogue to Language (HAL), Latent Semantic Analysis (LSA), Explicit Semantic Analysis (ESA), Latent Dirichlet Allocation (LDA), Pointwise Mutual Information—Information Retrieval (PMI-IR), Normalized Google Distance (NGD), Distributionally similar words using Co-occurrences (DISCO), etc.); semantic network-based measures (e.g., Least Common Subsumer, Path Length, etc.); and combinations of these measures.

The contact center analysis system may use various clustering algorithms for clustering the segmented communication data, such as partitional clustering (e.g., k-means, iterative self-organizing data analysis (ISODATA), partitioning around medoids (PAM), etc.); hierarchical clustering (e.g., divisive or agglomerative); density-based clustering (e.g., expectation maximization (EM), density-based spatial clustering of applications with noise (DBSCAN), etc.); classification-based clustering (e.g., decision trees, neural networks, etc.); grid-based clustering (e.g., Wave Clustering, Statistical Information Grid (STING), etc.); or variations of these algorithms.

In some embodiments, the contact center analysis system may use the clusters to a train a machine learning classifier to tag or label segments in new communications that fit best into each cluster. The classifier may be trained via supervised learning, using approaches such as those based on k-nearest neighbor, boosting, statistical methods, perceptrons, neural networks, decision trees, random forests, or support vector machines (SVMs), among others.

In some embodiments, the contact center analysis system may present the classifications in a graphical user interface including a detailed view of an individual communication for quick access and navigation to waypoints. For example, the graphical user interface may comprise an audio track and the classifications can operate as waypoints across the track, which upon a selection, can playback the portion of the audio corresponding to a selected waypoint. In addition or alternatively, the graphical user interface may include a text script and the classifications can operate as waypoints, which upon a selection, can jump to the portion of the script corresponding to a selected waypoint.

In some embodiments, the contact center analysis system can present the classifications in a graphical user interface including an aggregate view of communications. For example, a contact center administrator can filter, sort, or otherwise organize a collection of communications on the basis of a waypoint and playback that portion of each communication including audio and/or view that portion of each communication including text. The administrator can also tabulate, detect anomalies, conduct a/b analysis, predict future outcomes, discover hidden relationships, or otherwise mine communications that include a particular set of waypoints, that exclude a particular set of waypoints, or that both include a particular set of waypoints and exclude a particular set of waypoints.

Turning now to the drawings, FIG. 1 shows a first example of a network environment 100 for deploying various embodiments of the present disclosure. For any system or system element discussed in the present disclosure, there can be additional, fewer, or alternative components arranged in similar or alternative orders, or in parallel, within the scope of the various embodiments unless otherwise stated. Although FIG. 1 illustrates a client-server network architecture, other embodiments may utilize other network architectures, such as peer-to-peer or distributed network environments.

In this example, the network environment 100 includes an enterprise network 102, an IP network 104, a telecommunication network 106 (e.g., a public switched telephone network (PSTN)), and end user communication devices 108. FIG. 1 shows the enterprise network 102 integrating a contact center analysis system within the same private network but, in other embodiments, one or more contact center analysis stem components (e.g., hardware, firmware, and/or software for providing contact center analysis system functionality) may reside in a separate network. For instance, one or more components of the network environment 100 can be provided by third parties as services, such as described in FIG. 2 and elsewhere in the present disclosure. Another configuration may include one or more components of the enterprise network 102 residing within a public cloud (e.g., Amazon Web Services (AWS), Google Cloud, Microsoft Azure, etc.) in a configuration sometimes referred to as a hybrid cloud. One of ordinary skill in the art will appreciate that other embodiments may utilize any number of other configurations without departing from the scope of the present disclosure.

In this example, the enterprise network 102 includes a number of servers for providing functionality that may be generally applicable to any of the enterprise's business, such as a web server 110, an e-mail server 112, a database server 114, a directory server 116, and a chat server 118. The web server 110 can operate as a web interface between clients (e.g., the end user communication devices 108, enterprise workstation 120, agent workstation 122, supervisor workstation 124, etc.) and the enterprise network 102 over the IP network 104 via hypertext transfer protocol (HTTP), secure HTTP (HTTPS), and the like. The e-mail server 112 can operate as an interface between clients and the enterprise network 102 over the IP network 104 via an email protocol (e.g., Simple Mail Transfer Protocol (SMTP), Internet Message Access Protocol (IMAP), Post Office Protocol (POP), etc.). The database server 114 can operate as an interface between clients and storage resources (not shown) of the enterprise network 102. Storage can include hard-disk drives (HDDs), solid-state drives (SSDs), tape drivers, or other suitable data storage media. Storage can be located on-premise (e.g., operating on the enterprise's property, co-located with a data center vendor, etc.) or off-premise (e.g., public cloud storage). The directory server 116 can provide services related to identity, authentication, access control (e.g., security groups, privileges, etc.) key or certificate management, and the like. The chat server 118 can operate as an interface between clients and the enterprise network 102 over the IP network 104 via an instant messaging protocol (e.g., Extensible Messaging and Presence Protocol (XMPP), Open System for Communication in Realtime (OSCAR), Session Initiation Protocol for Instant Messaging and Presence Leveraging Extensions (SIMPLE), etc.).

In some embodiments, the enterprise network 102 can provide other types of interfaces for interacting with clients that combine some or all of these types of application servers. For example, the enterprise network 102 may provide an e-commerce application, a social network application, a stand-alone mobile application (app), and/or an application programming interface (API) (e.g., Restful state transfer (REST), Simple object Access Protocol (SOAP), Service Oriented Architecture (SOA), etc.), among numerous other possibilities, each of which may include a web server, an application server, and/or a data server.

In this example, the enterprise network 102 also includes a number of components that may be related to contact center functionality, such as a private branch exchange (PBX) 130, an automatic call distributor (ACD) 132, a computer telephony integrator (CTI) 134, a fax system 136, a call recorder 138, an interactive voice response (IVR) system 140, a voicemail system 142, a predictive dialing system 144, a voice recorder 146, and an application server 150. In some embodiments, one or more of these components may also operate within the enterprise network 102 to provide functionality other than for a contact center.

The PBX 130 can provide exchange or switching functionality for an organization's telephone system, manage central office lines or trunks, facilitate telephone calls between members within the organization's telephone system and between members and others outside of the telephone system. The ACD 132 can answer and distribute incoming calls to a specific group of terminals or CSRs. The ACD 132 can also utilize a voice menu to direct callers based on user selection, telephone number, the time of day of the call, or other condition. The CTI 134 integrates the operation of a telephone and a computer, such as to display caller information (e.g., the caller's name and number, the number dialed and the name of the person associated with that number, and other details regarding the caller or the person being called); control the telephone (e.g., answer, hang up, hold, conference, etc.) and telephone features (e.g., do not disturb (DND), call forwarding, callback, etc.); transfer and route telephone calls; and update a CSR's status (e.g., ready, busy, on a break, etc.).

The fax system 136 can provide an interface for transmission of facsimiles between clients and the enterprise network 102. The call recorder 138 can capture metadata regarding telephone calls (e.g., time of call, call duration, the CSR fielding the call, the caller's name and number, etc.). The IVR system 140 can provide a voice interface between clients and the enterprise network 102. Users may interact with the IVR system 140 by voice and/or keypad entry. The IVR system 140 may interact with the users by prerecorded or dynamically generated audio. The voicemail system 142 can provide an interface for callers to record messages over the telephone and users to manage recorded messages. The predictive dialing system 144 can evaluate factors such as compliance with local law relating to autodialing, determining whether a call is answered, distinguishing between answering machines and live users, etc., when automatically dialing telephone numbers. The predictive dialing system 144 may also use statistical algorithms to minimize the time users spend waiting between calls. For example, if statistics indicate that the average duration between dialing a number and a person answering a call is 10 seconds and a phone call lasts 60 seconds on average, the predictive dialing system 144 can begin calling a new number at 50 seconds and route to an available CSR.

The voice recorder 146 can create digital records of telephone calls between clients and the enterprise network 102. The voice recorder 146 can generate a digital representation of an audio wave form of a telephone call, capturing a CSR's voice signals or a customer's voice signals. In some embodiments, the voice record 146 can also capture audio signals and digital tones generated by client devices, generated by the IVR system 140, the CTI 134, and/or other audio generated by components of the enterprise network 102. The enterprise network 102 may utilize the database server to store the audio data captured by the voice recorder 146 as well as other communication data (e.g., emails, instant messages, SMS text messages, live chats, social network messages, voicemails, videos, and other media). The application server 150 can segment and annotate targeted portions of communications between users, and is discussed in greater detail with respect to FIG. 3 and elsewhere in the present disclosure The end user communication devices 108 can execute web browsers, e-mail clients, chat clients, instant messengers, SMS clients, social network applications, and other stand-alone applications for communicating with the enterprise network 102 over the IP network 104. The end user communication devices 108 can also communicate with the enterprise network 102 over the PSTN 106 by landline, cellular, facsimile, and other telecommunication methods supported by the PSTN 106. The end user communication devices 108 can operate any of a wide variety of desktop or server operating systems (e.g., Microsoft Windows, Linux, UNIX, Mac OS X, etc.), mobile operating systems (e.g., Apple iOS, Google Android, Windows Phone, etc.), or other operating systems or kernels. The end user communication devices 108 may include remote devices, servers, workstations, computers, general purpose computers, Internet appliances (e.g., switches, routers, gateways, firewalls, load balancers, etc.), hand-held devices, wireless devices, portable devices, wearable computers, cellular or mobile phones, desk phones, VoIP phones, fax machines, personal digital assistants (PDAs), smartphones, tablets, ultrabooks, netbooks, laptops, desktops, multi-processor systems, microprocessor-based or programmable consumer electronics, game consoles, set-top boxes, network PCs, mini-computers, and the like.

Figure 2:
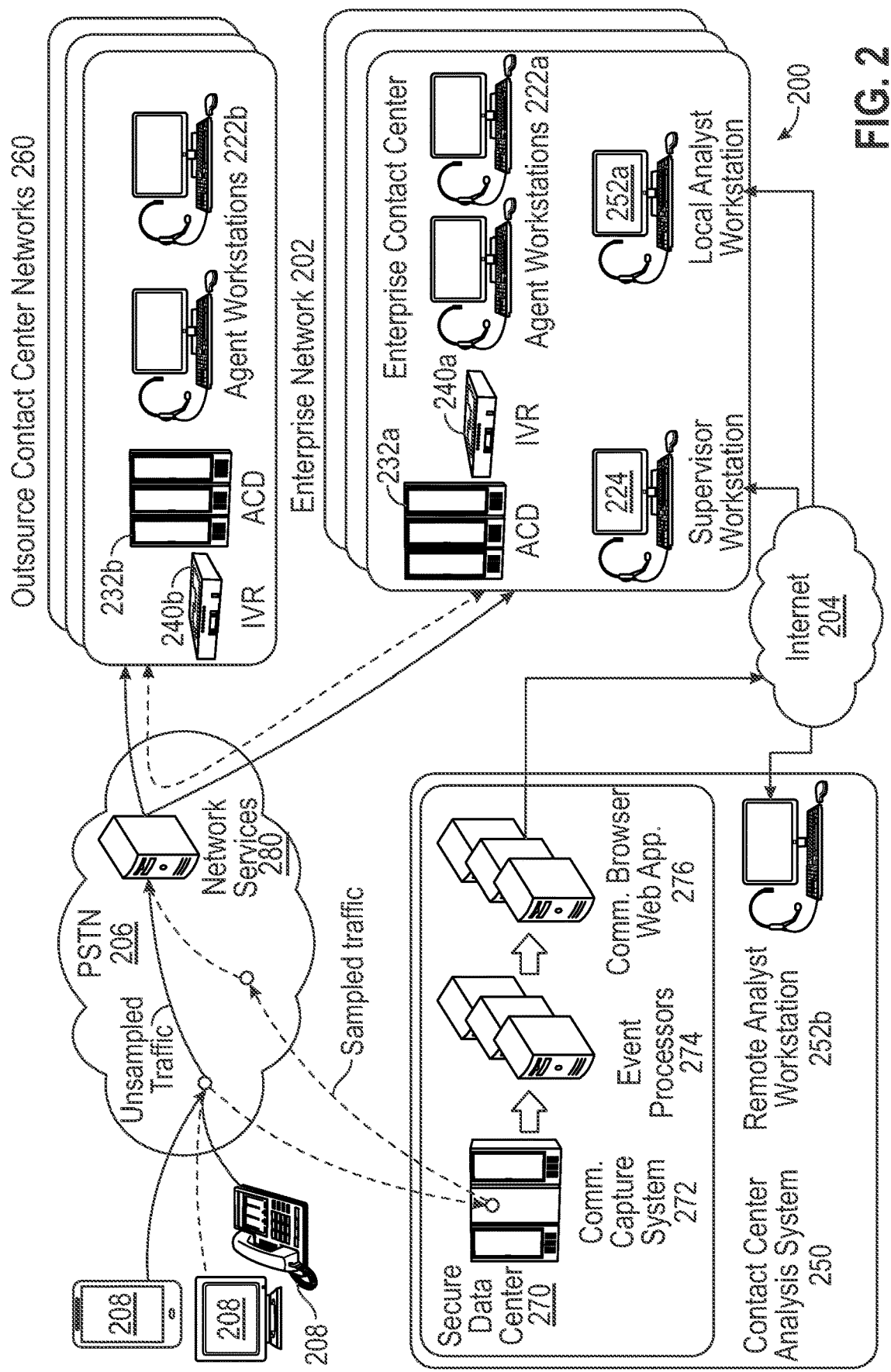
FIG. 2 illustrates a second example of a network environment in accordance with an embodiment.

FIG. 2 shows a second example of a network environment 200 for deploying various embodiments of the present disclosure. In this example, the network environment 200 includes an enterprise network 202, an IP network 204, a telecommunication network 206, end user communication devices 208, a contact center analysis system 250, and outsource contact center networks 260. Components of the network environment 200 corresponding to components of the network environment 100 of FIG. 1 may perform the same or similar functions. For example, IVR systems 240a and 240b may operate in a similar manner as the IVR system 140 of FIG. 1, to direct customers to CSRs or automated systems for addressing customer inquiries, provide customers with the option to wait in a queue for the next available CSR or to receive a callback, identify and authenticate customers, and log metadata for communications, among other tasks.

The enterprise network 202 includes agent workstations 222a, a supervisor workstation 224, an ACD 232a, and the IVR system 240a. The agent workstations 222a, the supervisor workstation 224, the ACD 232a, and the IVR system 240a can perform the same or similar functions as the agent workstation 122, the supervisor workstation 124, the ACD 132, and the IVR system 140 of FIG. 1, respectively. In this example, the enterprise network 202 also includes a local analyst workstation 252a for accessing and using the contact center analysis system 250. In other embodiments, the contact center analysis system 250 may additionally or alternatively include a remote analyst workstation 252b for performing the same or similar operations as the local analyst workstation 252a.

In some embodiments, an enterprise can outsource some or all of its contact center needs to a service provider, such as providers of the outsource contact center networks 260. For example, the outsource contact center networks 260 can field communications for a particular department, product line, foreign subsidiary, or other division of the enterprise; a type of communication (e.g., telephone calls, emails, text messages, etc.); a particular date and/or time period (e.g., the busy season for the enterprise, weekends, holidays, non-business hours in the U.S. for 24-hour customer support, etc.); a particular business condition (e.g., time periods when the volume of communications to the enterprise's contact centers surpass a threshold volume); or other suitable circumstances. To facilitate these outsourced tasks, the outsource contact center networks 260 can include an IVR system 240b, an ACD 232b, and agent workstations 222b, which can perform the same or similar functions as the IVR system 140, the ACD 132, or the agent workstation 122 of FIG. 1, respectively. In addition or alternatively, the IVR system 240b, the ACD 232b, and the agent workstations 222b can perform the same or similar functions as the IVR system 240a, the ACD 232b, and the agent workstations 222a, respectively.

The contact center analysis system 250 captures some or all communications between an enterprise and end users, processes the captured communications, and provides various tools for analyzing the communications. An example of an implementation of the contact center analysis system 250 is the AVOKE® Analytics platform provided by BBN Technologies® of Cambridge, Mass. The contact center analysis system 250 can include a remote analyst workstation 252b for configuring and managing the capture, processing, and analysis of communications between an enterprise (e.g., the enterprise's call centers and systems for handling communications from other supported communication channels, the enterprise's outsource partners, etc.) and its customers. The contact center analysis system 250 can also include a secure data center 270 for encrypting/decrypting or otherwise securing the communications and ensuring compliance with the Health Insurance Portability and Accountability Act (HIPAA), Sarbanes Oxley (SOX), the Payment Card Industry Data Security Standard (PCI DSS), and other government regulations, industry standards, and/or corporate policies.

The secure data center 270 can include a communication capturing system 272, event processors 274, and a communication browser application 276. The communication capturing system 272 receives and records communications and their associated metadata. In some embodiments, if the communication includes audio data (e.g., telephone call, voicemail, video, etc.), the communication capturing system 272 can also transcribe speech included in the audio data to text. The event processors 274 detect and process events within communications between customers and contact centers. For example, the event processors can analyze dialog segments and annotate certain segments as waypoint events relating to a business objective, target for improvement, audio browsing aid, or other predetermined criteria. Example implementations of the communication capturing system 272 and the event processors 274 are discussed in further detail with respect to FIGS. 3 and 4, and elsewhere in the present disclosure. The communication browser application 276 provides an interface for users to review communications, individually and in the aggregate, and gain additional insight from computer-assisted analytical tools. Example implementations of the communication browser application 276 are discussed in further detail with respect to FIGS. 5-7, and elsewhere in the present disclosure.

The telecommunications network 206 (e.g., a PSTN) includes a network services interface 280 for distributing communications to the enterprise network 202 and the outsource contact center networks 260. The network services interface 280 may also provide customer interaction services, such as IVR, prior to the distribution service. In some embodiments, the PSTN 206 can also facilitate sampling of the communications by the contact center analysis system 250 by routing some or all of the communications from the end user communication devices 208 through the contact center analysis system 250. The PSTN 206 can establish a sampling scheme by adding a new termination to an enterprise's contact telephone number that routes some or all of the communications to dedicated telephone numbers (e.g., inbound intermediate (or direct inward dial (DID)) numbers) provided by the contact center analysis system 250 for receiving inbound calls for that enterprise. In addition, the PSTN 206 can set up dedicated telephone numbers (e.g., outbound intermediate numbers) to receive calls from the contact center analysis system 250 and route to the enterprise's contact number. The PSTN 206 can allocate a certain percentage of the calls (e.g., a sampling rate) or all calls between the end user communication devices 208 and the enterprise network 202 to the contact center analysis system 250. When a customer dials the enterprise's contact number, the PSTN 206 may reroute that call to the inbound intermediate number of the contact center analysis system 250 depending on the sampling scheme. The contact center analysis system 250 can receive the inbound call, place a call to the outbound intermediate number of the enterprise passing through the customer's information (e.g., automatic number identification (ANI)), bridge the two calls, and initiate recording of the call. The PSTN 206 can receive calls to the outbound intermediate number and route the call to the enterprise's contact number.

Figure 3:
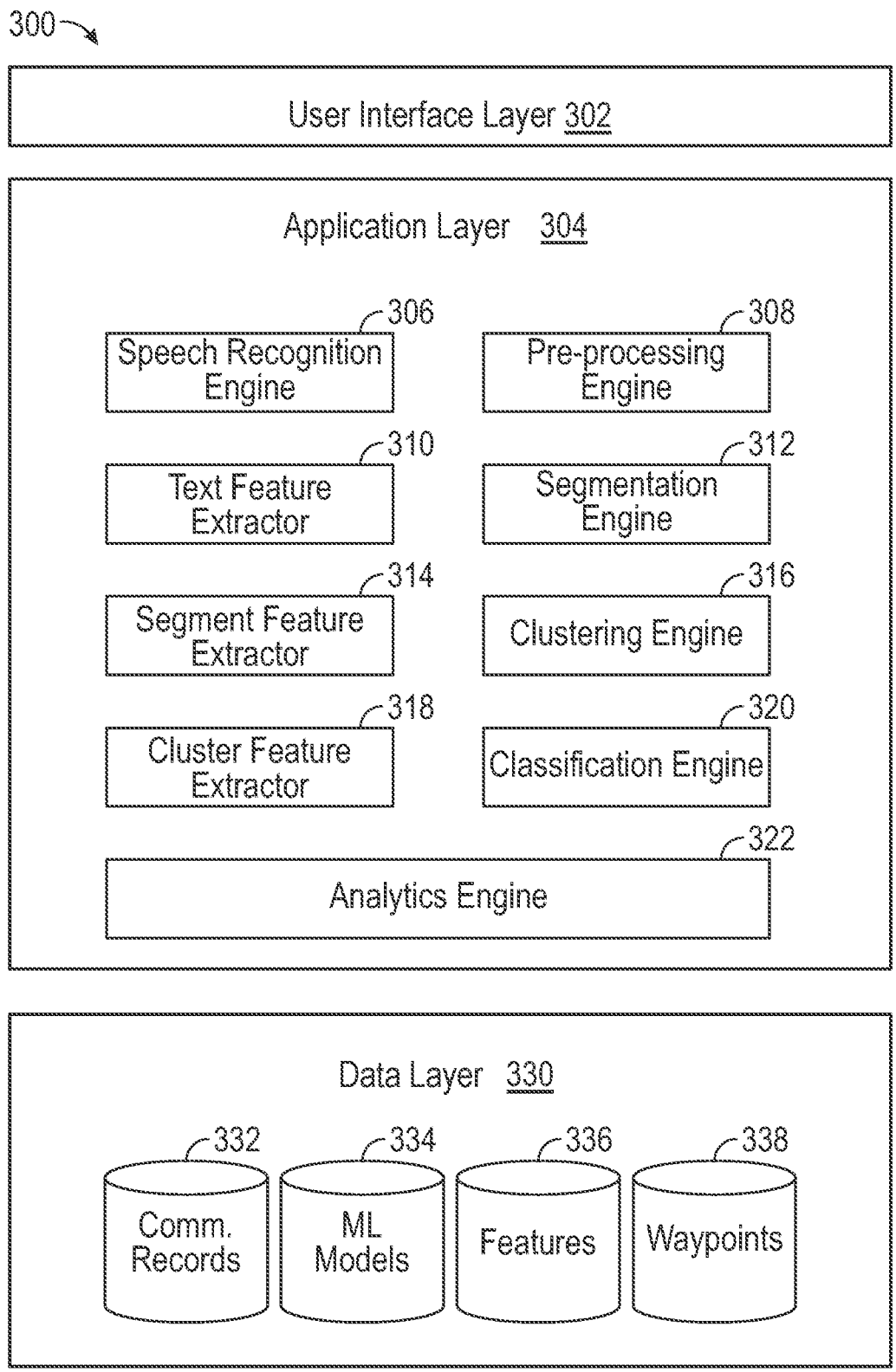
FIG. 3 illustrates an example of an architecture for a contact center analysis system in accordance with an embodiment.

FIG. 3 shows an example of an architecture for a contact center analysis system 300 including an interface layer 302, an application layer 304, and a data layer 330. Each module or component of the contact center analysis system 300 may represent a set of executable software instructions and the corresponding hardware (e.g., memory and processor) for executing the instructions. To avoid obscuring the subject matter of the present disclosure with unnecessary detail, various functional modules and components that may not be germane to conveying an understanding of the subject matter have been omitted. Of course, additional functional modules and components may be used with the contact center analysis system 300 to facilitate additional functionality that is not specifically described in the present disclosure. Further, the various functional modules and components shown in the contact center analysis system 300 may reside on a single server, or may be distributed across several servers in various arrangements. Moreover, although the contact center analysis system 300 utilizes a three-tiered architecture in this example, the subject matter of the present disclosure is by no means limited to such an architecture.

The interface layer 302 can include various interfaces (not shown) for enabling communications between client devices (e.g., the end user communication devices 108, the agent workstation 122, or the supervisor workstation 124 of FIG. 1) and the contact center analysis system 300. These interfaces may include a web interface, a standalone desktop application interface, a mobile application (app) interface, REST API endpoints or other API, a command-line interface, a voice command interface, or other suitable interface for exchanging data between the clients and the contact center analysis system 300. The interfaces can receive requests from various client devices, and in response to the received requests, the interface layer 302 can access the application layer 304 to communicate appropriate responses to the requesting devices.

The application layer 304 can include a number of components for supporting contact center analysis system functions, such as a speech recognition engine 306, a preprocessing engine 308, a text feature extractor 310, a segmentation engine 312, a segment feature extractor 314, a clustering engine 316, a cluster feature extractor 318, a classification engine 320, and an analytics engine 322. Although the feature extractors 310, 314, and 318 are shown to be separate and distinct components from their associated engines (e.g., the segmentation engine 312, the clustering engine 316, and the classification engine 320) in this example, other embodiments may integrate one or more of the extractors with their corresponding engines, divide a component of the application layer 304 into additional components, divide and combine components into other logical units, or otherwise utilize a different configuration for the contact center analysis system 300.

The speech recognition engine 306 can translate audio captured from telephone calls and video conferences between contact center agents (e.g., IVRs or CSRs) and customers, voicemails from customers, instant messages attaching audio, and other electronic communications including audio or video data. In some embodiments, the speech recognition engine 306 can annotate text translated from audio data to identify users speaking at corresponding portions of the text, confidence levels of the speech-to-text translation of each word or phrase (or denote translations below a confidence threshold), prosodic features of utterances (e.g., pitch, stress, volume, etc.), temporal features (e.g., durations of segments of speech, pauses or other idle time, etc.), and other metadata. Examples of speech recognition engines include Kaldi from Johns Hopkins University, Sphinx from Carnegie Mellon University, Hidden Markov Model Toolkit (HTK) from Cambridge University, and Julius from the Interactive Speech Technology Consortium. The speech recognition engine 306 may be the same or different from the speech recognition functionality utilized by an IVR system (e.g., the IVR system 140 of FIG. 1).

The pre-processing engine 308 can perform initial processing tasks on raw communication data, text translated from speech, and other preliminary forms of communication data to prepare them for input to other engines of the contact center analysis system 300. These pre-processing tasks can include cleaning the communication data (e.g., removing white space, stop words, etc.), formatting the communication data (e.g., encoding the communication data as extensible mark-up language (XML), Javascript notation (JSON), microdata, Resource Definition Framework in Attributes (RDFa), or other suitable format), identifying the type of the communication (e.g., text translated from a telephone call, email, text message, etc.), and the like.

The text feature extractor 310 can annotate the words and phrases of a communication with their characteristics or features relevant to segmentation and other processes further down in the pipeline. In some embodiments, the segmentation engine 312 can segment a communication into sentences based on temporal features and lexical features of the words and phrases of the communication. The text feature extractor 310 can parse a communication, identify the feature values for the words and phrases of the communication, and generate a representation of the communication (e.g., a feature vector or matrix). For example, a communication can be represented as a vector of a size equal to the number n of words and phrases of the communication (e.g., [$x_1$, $x_2$, $x_3$, ... $x_n$]) and $0 \leq x_i \leq 1$, where the value of $x_i$ represents the likelihood that it marks the boundary of a segment. A temporal feature indicative of a word or phrase marking a boundary of a segment may be pauses in the communication lasting more than 500 ms. When the text feature extractor 310 parses a communication and finds this occurrence, the text feature extractor 310 can increment $x_i$ and $x_{i+1}$ for the words and phrases uttered in between the pause. Other temporal features include durations for uttering words and phrases, timestamps (e.g., the speech recognition engine may mark a communication with a timestamp when a conversation switches from one user to the next), varying lengths of pauses (e.g., a pause greater than 2 s may be a stronger indicator of a segment boundary), among others.

A lexical feature indicative of a word or phrase marking the beginning of a segment may be the utterance of "uh." The text feature extractor 310 can increment $x_i$ in the feature vector for the communication whenever "uh" appears in the communication. Other lexical features can include the term frequency-inverse document frequency (tf-idf) score of words and phrases relative to an individual communication and/or corpus of communications, the probability of certain words and phrases being repeated in the same segment (e.g., there may be a low probability that "don't" appears twice in the same sentence), pairwise or sequential probability of words and phrases (e.g., the probability a pair of words or a sequence of words occurring together in a sentence, paragraph, document, etc.), and other characteristics of the words and phrases of a communication.

In other embodiments, the text feature extractor 310 may additionally or alternatively calculate the feature values of other types of features for segmenting the communication data (e.g., syntactic features, audio or prosodic features, user features, etc.). In addition or alternatively, other embodiments may also use different types of segments (e.g., parts of speech, paragraphs, etc.).

The segment feature extractor 314 can receive the segments output by the segmentation engine 312, determine the features of the segments that may be relevant to clustering and other processes in the pipeline, and generate representations of the segment features. In some embodiments, the segment feature extractor 314 may determine the semantic similarity of segments for input into the clustering engine 316. Semantic similarity measures include those based on semantic networks and corpus-based measures.

Semantic networks are graphs used to represent the similarity or relatedness of words and phrases. An example of a semantic network is WordNet, an English-language lexical database that groups words into sets of synonyms (referred to as "synsets") and annotates relationships between synsets, such as hypernyms, hyponyms, troponyms, and entailments (e.g., is-a-kind-of), coordinate terms (e.g., share a hypernym), meronyms and holonyms (e.g., is-a-part-of), etc. Various semantic similarity measures use different ways of measuring similarity between a pair of words based on how to traverse a semantic network and how to quantify nodes (e.g., words) and edges (e.g., relationships) during traversal. Examples of semantic similarity measures include the Least Common Subsumer, Path Distance Similarity, Lexical Chains, Overlapping Glosses, and Vector Pairs. The Least Common Subsumer uses is-a-kind-of relationships to measure the similarity between a pair of words by locating the most specific concept which is an ancestor of both words. One example for quantifying the semantic similarity calculates the "information content" of a concept as negative log d, where d is the depth of the tree including the pair of words having the least common subsumer as its root, and where the similarity is a value between 0 and 1 (e.g., Resnik semantic similarity). Variations of the Least Common Subsumer normalize the information content for the least common subsumer, such as by calculating the sum of the information content of the pair of words and scaling the information content for the least common subsumer by this sum (e.g., Lin semantic similarity), taking the difference of this sum and the information content of the least common subsumer (e.g., Jiang & Conrath semantic similarity).

Path Distance Similarity measures the semantic similarity of a pair of words based on the shortest path that connects them in the is-a-kind of (e.g., hypernym/hyponym) taxonomy. Variations of Path Distance Similarity normalize the shortest path value using the depths of the pair of words in the taxonomy (e.g., Wu & Palmer semantic similarity) or the maximum depth of the taxonomy (e.g., Leacock and Chodorow).

Lexical Chains measure semantic relatedness by identifying lexical chains associating two concepts, and classifying relatedness of a pair of words as "extra-strong," "strong," and "medium-strong." Overlapping glosses measure semantic relatedness using the "glosses" (e.g., brief definition) of two synsets, and quantifies relatedness as the sum of the squares of the overlap lengths. Vector pairs measure semantic relatedness using co-occurrence matrices for words in the glosses from a particular corpus and represents each gloss as a vector of the average of the co-occurrence matrices.

Corpus-based measures quantify semantic similarity between a pair of words from large corpora of text, such as Internet indices, encyclopedias, newspaper archives, etc. Examples of corpus-based semantic similarity measures include Hyperspace Analogue to Language (HAL), Latent Semantic Analysis (LSA), Latent Dirichlet Allocation (LDA), Explicit Semantic Analysis (ESA), Pointwise Mutual Information—Information Retrieval (PMI-IR), Normalized Google Distance (NGD), and Distributionally similar words using Co-occurrences (DISCO), among others. HAL computes matrices in which each matrix element represents the strength of association between a word represented by a row and a word represented by a column. As text is analyzed, a focus word is placed at the beginning of a ten-word window that records which neighboring words are counted as co-occurring. Matrix values are accumulated by weighting the co-occurrence inversely proportional to the distance from the focus word, with closer neighboring weighted higher. HAL also records word-ordering information by treating co-occurrences differently based on whether the neighboring word appears before or after the focus word.

LSA computes matrices in which each matrix element represents a word count per paragraph of a text with each row representing a unique word and each column representing a paragraph of the text. LSA uses singular value decomposition (SVD) to reduce the number of columns while preserving the similarity structure among rows. Words are then compared by taking the cosine angle between the two vectors formed by any two rows.

A variation of LSA is LDA in that both treat each document as a mixture of various topics of a corpus. However, while LSA utilizes a uniform Dirichlet prior distribution model (e.g., a type of probability distribution), LDA utilizes a sparse Dirichlet prior distribution model. LDA involves randomly assigning each word in each document to one of k topics to produce topic representations for all documents and word distributions for all topics. After these preliminary topic representations and word distribution are determined, LDA computes, for each document and each word in the document, the percentage of words in the document that were generated from a particular topic and the percentage of that topic that came from a particular word across all documents. LDA will reassign a word to a new topic when the product of the percentage of the new topic in the document and the percentage of the word in the new topic exceeds the product of the percentage of the previous topic in the document and the percentage of the word in the previous topic. After many iterations, LDA converges to a steady state (e.g., the topics converge into k distinct topics). Because LDA is unsupervised, it may converge to very different topics with only slight variations in training data. Some variants of LDA, such as seeded LDA or semi-supervised LDA, can be seeded with terms specific to known topics to ensure that these topics are consistently identified.

ESA represents words (or other segments) as high-dimensional vectors with each vector element representing the tf-idf weight of a word relative to a text. The semantic relatedness between words (or other segments) is quantified as the cosine similarity measure between the corresponding vectors.

PMI-IR computes the similarity of a pair of words using search engine querying to identify how often two words co-occur near each other on a web page as the measure of semantic similarity. A variation of PMI-IR measures semantic similarity based on the number of hits returned by a search engine for a pair of words individually and the number of hits for the combination of the pair (e.g., Normalized Google Distance). DISCO computes distributional similarity between words using a context window of size±3 words for counting co-occurrences. DISCO can receive a pair of words, retrieve the word vectors for each word from an index of a corpus, and compute cosine similarity between the word vectors. Example implementations of semantic similarity measures can be found in the WordNet::Similarity and Natural Language Toolkit (NLTK) packages.

In other embodiments, the segment feature extractor 314 may additionally or alternatively calculate other similarity measures for the segments of a communication, such as character-based measures or term-based measures. Character-based measures determine the lexical similarity of a pair of strings or the extent to which they share a similar character sequences. Examples of character-based similarity measures include Longest Common Substring (LCS), Damerau-Levenshtein, Jaro, Needleman-Wunsch, Smith-Waterman, and N-gram, among others. LCS measures the similarity between two strings as the length of the longest contiguous chain of characters in both strings. Damerau-Levenshtein measures distance between two strings by counting the minimum number of operations to transform one string into the other. Jaro measures similarity between two strings using the number and order of common characters between the two strings. Needleman-Wunsch measures similarity by performing a global alignment to identify the best alignment over the entire of two sequences. Smith-Waterman measures similarity by performing a local alignment to identify the best alignment over the conserved domain of two sequences. N-grams measure similarity using the n-grams (e.g., a subsequence of n items of a sequence of text) from each character or word in the two strings. Distance is computed by dividing the number of similar n-grams by the maximal number of n-grams.

Term-based similarity also measures lexical similarity between strings but analyzes similarity at the word level using various numeric measures of similarity, distance, density, and the like. Examples of term-based similarity measures include the Euclidean distance, Manhattan distance, cosine similarity, Jaccard similarity, and matching coefficients. The Euclidean distance (sometimes also referred to as the L2 distance) is the square root of the sum of squared differences between corresponding elements of a pair of segments. The Manhattan distance (sometimes referred to as the block distance, boxcar distance, absolute value distance, L1 distance, or city block distance) is the sum of the differences of the distances it would take to travel to get from one feature value of a first vector to a corresponding feature value of a second vector if a grid-like path is followed. Cosine similarity involves calculating the inner product space of two vectors and measuring similarity based on the cosine of the angle between them. Jacard similarity is the number of shared words and phrases over the number of all unique terms in both segments.

The clustering engine 316 can receive the output of the segment feature extractor 314 for clustering segments based on one or more of the similarity measures discussed in the present disclosure. In some embodiments, the clustering engine 316 may implement k-means clustering. In k-means clustering, a number of n data points are partitioned into k clusters such that each point belongs to a cluster with the nearest mean. The algorithm proceeds by alternating steps, assignment and update. During assignment, each point is assigned to a cluster whose mean yields the least within-cluster sum of squares (WCSS) (e.g., the nearest mean). During update, the new means is calculated to be the centroids of the points in the new clusters. Convergence is achieved when the assignments no longer change. One variation of k-means clustering dynamically adjusts the number of clusters by merging and splitting clusters according to predefined thresholds. The new k is used as the expected number of clusters for the next iteration (e.g., ISODATA). Another variation of k-means clustering uses real data points (medoids) as the cluster centers (e.g., PAM).

In other embodiments, the clustering engine 316 can implement other clustering techniques, such as hierarchical clustering (e.g., divisive or agglomerative); density-based clustering (e.g., expectation maximization (EM), density-based spatial clustering of applications with noise (DB-SCAN), etc.); classification-based clustering (e.g., decision trees, neural networks, etc.); grid-based clustering (e.g., fuzzy, evolutionary, etc.); and variations of these algorithms.

Hierarchical clustering methods sort data into a hierarchical structure (e.g., tree, weighted graph, etc.) based on a similarity measure. Hierarchical clustering can be categorized as divisive or agglomerate. Divisive hierarchical clustering involves splitting or decomposing "central" nodes of the hierarchical structure where the measure of "centrality" can be based on "degree" centrality, (e.g., a node having the most number of edges incident on the node or the most number of edges to and/or from the node), "betweenness" centrality (e.g., a node operating the most number of times as a bridge along the shortest path between two nodes), "closeness" centrality (e.g., a node having the minimum average length of the shortest path between the node and all other nodes of the graph), among others (e.g., Eigenvector centrality, percolation centrality, cross-clique centrality, Freeman centrality, etc.). Agglomerative clustering takes an opposite approach from divisive hierarchical clustering. Instead of beginning from the top of the hierarchy to the bottom, agglomerative clustering traverses the hierarchy from the bottom to the top. In such an approach, clustering may be initiated with individual nodes and gradually combine nodes or groups of nodes together to form larger clusters. Certain measures of the quality of the cluster determine the nodes to group together at each iteration. A common measure of such quality is graph modularity.

Density-based clustering is premised on the idea that data points are distributed according to a limited number of probability distributions that can be derived from certain density functions (e.g., multivariate Gaussian, t-distribution, or variations) that may differ only in parameters. If the distributions are known, finding the clusters of a data set becomes a matter of estimating the parameters of a finite set of underlying models. EM is an iterative process for finding the maximum likelihood or maximum a posteriori estimates of parameters in a statistical model, where the model depends on unobserved latent variables. The EM iteration alternates between performing an expectation (E) step, which creates a function for the expectation of the log-likelihood evaluated using the current estimate for the parameters, and a maximization (M) step, which computes parameters maximizing the expected log-likelihood found during the E step. These parameter-estimates are then used to determine the distribution of the latent variables in the next E step.

DBSCAN takes each point of a dataset to be the center of a sphere of radius epsilon and the counts the number of points within the sphere. If the number points within the sphere are more than a threshold, then the points inside the sphere belong to the same cluster. DBSCAN expands the sphere in the next iteration using the new sphere center and apply the same criteria for the data points in the new sphere. When the number of points inside a sphere are less than the threshold, that data point is ignored.

Classification-based clustering apply the principles of machine learning classification principles to identify clusters and members of each cluster. Examples of classification-based clustering are discussed with respect to the classification engine 320 further below.

Grid-based clustering divides a data space into a set of cells or cubes by a grid. This structure is then used as a basis for determining the final data partitioning. Examples of grid-based clustering include Wave Clustering and Statistical Information Grid (STING). Wave clustering fits the data space onto a multi-dimensional grid, transforms the grid by applying wavelet transformations, and identifies dense regions in the transformed data space. STING divides a data space into rectangular cells and computes various features for each cell (e.g., mean, maximum value, minimum value, etc.). Features of higher level cells are computed from lower level cells. Dense clusters can be identified based on count and cell size information.

The cluster feature extractor 318 can receive the output of the clustering engine 316, determine the features of each cluster that may be relevant to classification and other processes in the pipeline, and generate representations of the cluster features.

The classification engine 320 can receive segment features (and/or other features determined further back in the pipeline) to tag or label new segments according to a machine learning classifier. In some embodiments, the classification engine 320 may utilize supervised learning to build the machine learning classifier for analyzing the segments and their features. In supervised learning, the classification engine 320 can input training data samples (e.g., clusters), classified according to predetermined criteria, to learn the model (e.g., extrapolate the features and feature values) for mapping new unclassified samples to one or more of the classifications. For example, a contact center administrator can review a set of clusters and manually tag or annotate the clusters when she identifies a waypoint or a portion of a communication relating to a business objective, target for improvement, or other predetermined criteria. Table 1 sets forth examples of waypoint labels that can be used for labeling communication data and some of the content of the communication data that can be associated with the labels.

TABLE 1

Examples of Waypoint Labels and Corresponding Communication Content

| Waypoint Label | Content of Communication |
| --- | --- |
| Agent_greeting | CONTACTING, FIRST_AND_LAST_NAME, THANK, FIRST_NAME, NAME, DIRECTOR, START, BY, GETTING, |
| " | THANK, PATIENCE, |
| " | FIRST_AND_LAST_NAME, THANK_YOU_FOR_CALLING, NAME, DIRECTOR, CUSTOMER, SUPPORT, SPEAKING, PLEASE, FIRST_NAME, |
| Call_reason | DESCRIPTION, BRIEF, REASON, RESOURCE, APPROPRIATE, DIRECTOR, DIRECT, CUSTOMER, |
| Callback_number | DISCONNECTED, CALLBACK_NUMBER, CASE, |
| Agent_ownership | DEFINITELY, |
| Call_transition | WELCOME, DAY, THANK_YOU, GREAT, REST, BYE_BYE, BYE, BYEBYE, WONDERFUL, APPRECIATE, THANK_YOU_VERY_MUCH, THANK_YOU_SO_MUCH, ENJOY, TOO, HOPE, |
| Case/reference_number | CASE_NUMBER, REFERENCE, AUDIO_FILES, |
| Communication_Check | UNDERSTAND, DEFINITELY, |
| " | HOLD, |
| Difficulty_Hearing | HEAR, BARELY, |
| Email | EMAIL_ADDRESS, HOTMAIL, AOL, DOT_COM, DOT_NET, COMCAST, |
| " | EMAIL, SEND, RESCUE, |
| Email_AcmeID | ACME_ID, MANAGE, SIGN_IN, NEMO, |
| Empathy | I_AM_SORRY, |
| Internet_connection | CONNECTING, SERVER, INTERNET, |
| Mail | TRASH, RID, EMPTY, |
| Network_connection | WI-FI, NETWORK, CONNECTED, |
| Password | PASSWORD, RESET, |
| Put_on_hold | BRIEF, PLACE, HOLD, MIND, |
| Reason_Transfer_info | OVER, ASSIST, TECHNICIAN, DEPARTMENT, TRANSFERRED, TECHNICIANS, FURTHER, SPECIALIST, OUR, TECHNICAL_SUPPORT, TRANSFER, |
| Screen_navigation | DOUBLE, HD |
| " | SCROLL, DOWN, |
| " | HAND, CORNER, LEFT, UPPER, SIDE, TOP, LOGO, |
| Screen_share | SHARING, SCREEN, CUSTOMER_SUPPORT, SESSION, FILENAME, |
| Security_questions | CHILDHOOD_NICKNAME, OWNED, HIGH_SCHOOL, PET, FAVORITE, CAR, MODEL, CARS, SPORTS, FIRST, FIRST_NAME, |
| " | QUESTIONS, SECURITY, IDENTITY, ANSWER, VERIFY, |
| Security | RESTRICTIONS, BLACKLIST, EXPLICIT, PARENTS', TAPPING, SHUTTER, CALLERS, RECENTS, CAPPING, ABSURD, TIMER, SELPHIE, CONSENT, BRINGER, LP'S, FEATURES, INSTALLATION, FLAG, MESSAGES, CALLER, |
| Send, to, web | DOT, DOT_COM, WWW, FINISHED, |
| Serial_number | YX, CK, SERIAL_NUMBER, EXAMPLE, |
| Session, key | SESSION, KEY, PARAGRAPH, |
| Settings | SETTINGS, GENERAL, |
| Troubleshooting | SHIFT, KEY, KEYBOARD, COMMAND, |
| " | LOOKS, |
| " | SWITCHBOARD, LET'S, |
| " | BACK, |
| " | TURN, OFF, TURNED, |
| " | CLICK, |
| " | CLICK_ON, |
| " | GO_AHEAD_AND, |
| " | POWER_BUTTON, BUTTON, SHUT, HOME, DOWN, COMMAND, HOLDING, SECONDS, |
| " | TOP, BOTTOM, BAR, MENU, |
| " | TRYING, |
| " | PLUG, PLUGGED, COMPUTER, UNPLUG, USB, WALL, |
| Wait | MOMENT, GIVE, |
| " | MINUTE, WAIT, BURNING, |
| " | SECOND, BEAR, GIMME, HANG, |

Examples of supervised learning algorithms include k-nearest neighbor (a variation of the k-means algorithm discussed above), boosting, statistical methods, perceptrons/neural networks, decision trees/random forests, support vector machines (SVMs), among others. Boosting methods attempt to identify a highly accurate hypothesis (e.g., low error rate) from a combination of many "weak" hypotheses (e.g., substantial error rate). Given a data set comprising examples within a class and not within the class and weights based on the difficulty of classifying an example and a weak set of classifiers, boosting generates and calls a new weak classifier in each of a series of rounds. For each call, the distribution of weights is updated to reflect the importance of examples in the data set for the classification. On each round, the weights of each incorrectly classified example are increased, and the weights of each correctly classified example is decreased so the new classifier focuses on the difficult examples (i.e., those examples have not been correctly classified). Example implementations of boosting include Adaptive Boosting (AdaBoost), Gradient Tree Boosting, or XGBoost.

Statistical methods rely on probability models for predicting whether an instance belongs in a class and example approaches include Linear discriminant analysis (LDA), Maximum Entropy (MaxEnt) and Naïve Bayes classifiers, and Bayesian networks. LDA and variants find the linear combination of features of training data samples for separating classes and apply the linear combination to predict the classes of new data samples. MaxEnt determines an exponential model for classification decisions that has maximum entropy while being constrained to match the class distribution in the training data which, in some sense, extracts the maximum information from training. Bayesian networks comprise direct acyclic graphs (DAGs) in which edges represent probability relationships and nodes represent features with the additional condition that the nodes are independent from non-descendants of the node's parents. Learning the Bayesian network involves identifying the DAG structure of the network and its parameters. Probabilistic features are encoded into a set of tables, one for each feature value, in the form of local conditional distributions of a feature given its parents. As the independence of the nodes have been written into the tables, the joint distribution resolves down to the multiplication of the tables.

Neural networks are inspired by biological neural networks and comprise an interconnected group of functions or classifiers (e.g., perceptrons) that process information using a connectionist approach. Neural networks change their structure during training, such as by merging overlapping detections within one network and training an arbitration network to combine the results from different networks. Examples of neural network algorithms include the multi-layer neural network, the auto associative neural network, the probabilistic decision-based neural network (PDBNN), and the sparse network of winnows (SNOW).

Random forests rely on a combination of decision trees in which each tree depends on the values of a random vector sampled independently and with the same distribution for all trees in the forest. A random forest can be trained for some number of trees t by sampling n cases of the training data at random with replacement to create a subset of the training data. At each node, a number m of the features are selected at random from the set of all features. The feature that provides the best split is used to do a binary split on that node. At the next node, another number m of the features are selected at random and the process is repeated.

SVMs involve plotting data points in n-dimensional space (where n is the number of features of the data points) and identifying the hyper-plane that differentiates classes and maximizes the distances between the data points of the classes (referred to as the margin).

In addition or alternatively, some embodiments may implement unsupervised learning or semi-supervised learning for finding patterns in the communication data, such as to determine suitable sizes for segments or clusters, or classifications; determine whether known features may or may not be relevant for segmentation, clustering, or classification; discover latent features; identify the set of classifications for training the machine learning model; or perform other tasks that may not have discrete solutions. Examples of unsupervised learning techniques include principle component analysis (PCA), expectation-maximization (EM), clustering, and others discussed elsewhere in the present disclosure.

PCA uses an orthogonal transformation to convert a set of data points of possibly correlated variables into a set of values of linearly uncorrelated variables called principal components. The number of principal components is less than or equal to the number of original variables. This transformation is defined in a manner such that the first principal component has the largest possible variance (e.g., the principal component accounts for as much of the variability in the data as possible), and each succeeding component in turn has the highest variance possible under the constraint that it is orthogonal to the preceding components. The resulting vectors are an uncorrelated orthogonal basis set.

EM is an iterative process for finding the maximum likelihood or maximum a posteriori estimates of parameters in a statistical model, where the model depends on unobserved latent variables. The EM iteration alternates between performing an expectation (E) step, which creates a function for the expectation of the log-likelihood evaluated using the current estimate for the parameters, and a maximization (M) step, which computes parameters maximizing the expected log-likelihood found during the E step. These parameter-estimates are then used to determine the distribution of the latent variables in the next E step.

The analytics engine 322 can perform various post-processing tasks for mining the communication data in real time or substantially real time or as part of a batch process. The analytics engine 322 is discussed further below with respect to FIGS. 5-7 and elsewhere in the present disclosure.

The data layer 330 can operate as long-term storage (e.g., persisting beyond a process call that received and/or generated the data) for the operations of the contact center analysis system 300. In this example, the data layer 330 can include a communication record data store 332, a machine learning model data store 334, a feature data store 336, and a waypoint data store 338. The communication record data store 332 can store one or more versions of a communication, such as the raw communication (e.g., audio or video data, Multipurpose Internet Mail Extensions (MIME) message, etc.), a preliminary form of the communication (e.g., text translated from speech in audio or video), a formatted version of the communication (e.g., XML, JSON, RDFa, etc.), a version of the communication translated to a different language, the metadata for the communication, and other data associated with the communication. In other embodiments, the metadata for the communication and the communication content may be stored in separate repositories.

The machine learning model data store 334 can store training data points for the classification engine 320, information gained from unsupervised learning, the machine learning models derived from supervised learning, and other related information. In some embodiments, the contact center analysis system 300 can maintain multiple machine learning models and associated data for classifying new communications based on the context of the new communications. For example, the contact center analysis system 300 can store different machine learning models and their related information, and apply a particular model to a new communication based on the type of the new communication (e.g., telephone call, email, or live chat, etc.); the business department (e.g., technical support, sales, accounting, etc.) the communication is directed to by an ACD (e.g., the ACD 132 of FIG. 1), an IVR system (e.g., the IVR system 140), telephone number, email address, and the like; a particular product line (e.g., cable television, telephone service, Internet access service, etc.) to which the communication is directed; the language of the communication (e.g., English, Spanish, etc.); a/b testing group associated with the communication if the business is testing a new script for CSRs; and other suitable contexts.

The features data store 336 can store the features extracted by the text feature extractor 310, the segment feature extractor 314, and/or the cluster feature extractor 318 so that the features may be used for different stages of the communication data processing pipeline, for data mining, for unsupervised learning to discover latent features or otherwise improve segmentation, clustering, and/or classification, for historical reporting, or other suitable purpose. In some embodiments, the contact center analysis system 300 may utilize different storage schemes depending on the age of the feature data, such as migrating feature data more than a year old or other specified time period from HDDs or SDDs to tape drives.

The waypoints data store 338 can store the waypoints and other labels or tags identified by the classification engine 320. In this example, the waypoints, labels, and/or tags are shown to be stored separately from the communication records for illustrative purposes but in many other embodiments, the waypoints, labels, and/or tags may be stored within the communication records data store 332 or other repository for the metadata of communication records.

Figure 4:
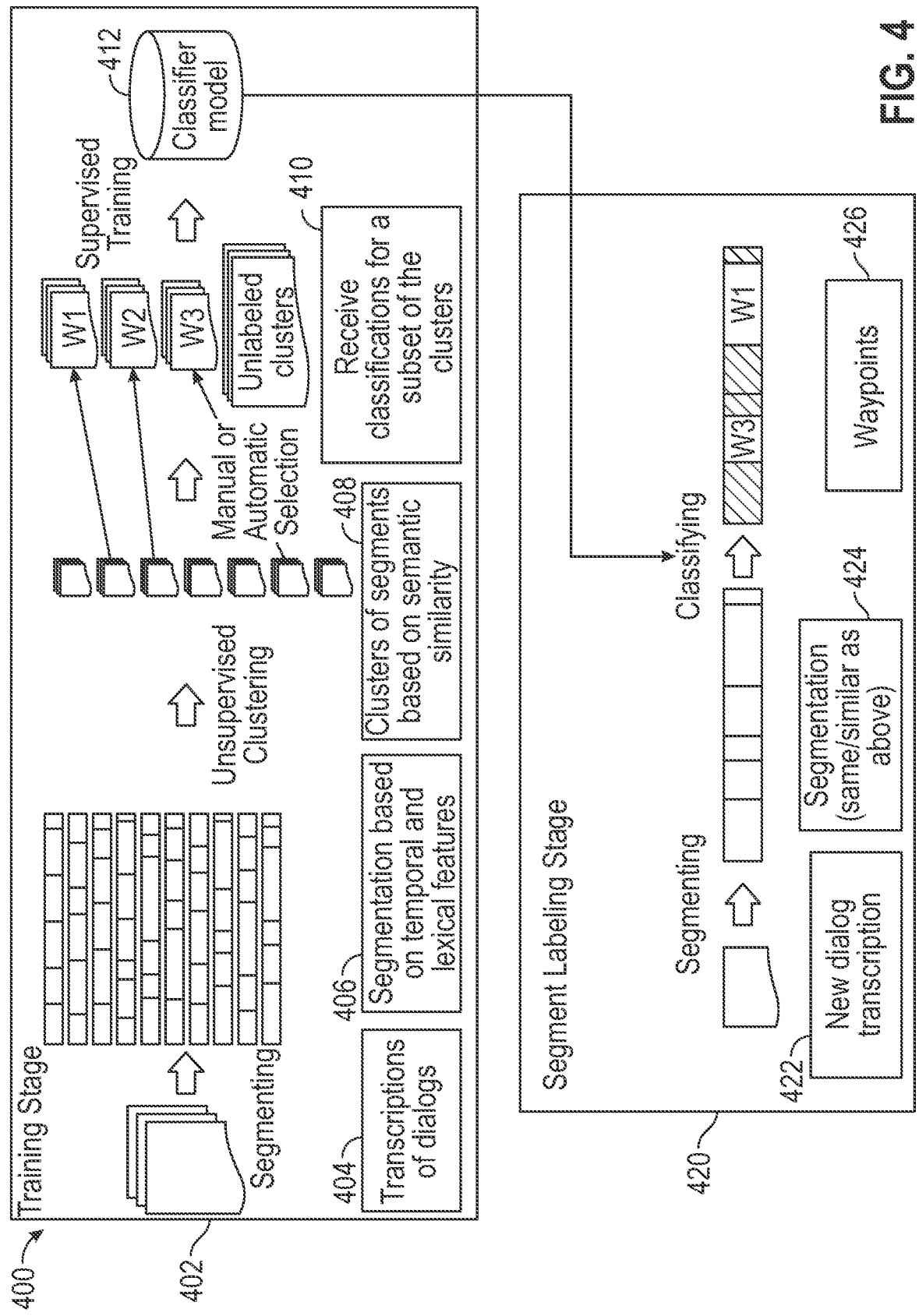
FIG. 4 illustrates an example of a data flow diagram for segmenting and annotating targeted portions of communications in accordance with an embodiment.

FIG. 4 shows an example of a data flow diagram 400 for segmenting and annotating targeted portions of communications. For any method, process, or flow discussed herein, there can be additional, fewer, or alternative steps performed or stages that occur in similar or alternative orders, or in parallel, within the scope of various embodiments unless otherwise stated.

A contact center analysis system (e.g., the contact center analysis system 250 of FIG. 2 or the contact center analysis system 300 of FIG. 3) can implement one or more portions of the data flow diagram 400, which can include a training stage 402 and a segment labeling stage 420. The contact center analysis system can receive some (based on a sampling rate) or all communications across multiple channels (e.g., telephone, email, live chat, text message, etc.), capture and log the communications and their metadata (e.g., the time that the enterprise network received the communication, the CSR fielding the communication, customer identification information, business department to which the customer inquiry is directed, the communication channel, etc.). During the training stage 402, the contact center analysis system can capture n number of communications (or retrieve n number of historical communications), where n represents the size of the training set of communications for training a machine learning classifier for identifying portions of the communications that are relevant to a user (e.g., administrator, supervisor, CSR, etc.) developing the training set. The first part of the training stage 402 may include a transcription phase 404 in which the system transcribes audio data included in the communications to text. Although this example illustrates the communications including audio data, such as from a telephone conversation, voicemail, video, or electronic message attachment, other embodiments may also process communications from channels in which the communications are already in text form (e.g., email, live chat, social network message, etc.) and thus, do not need to perform speech-to-text transcription. In some embodiments, the contact center analysis system may utilize an omni-channel machine learning classifier for classifying all communications. In other embodiments, the contact center analysis system may use several single-channel or multi-channel machine learning classifiers for annotating the communications from different subsets of channels (e.g., a first classifier for telephone calls and live chats, a second classifier for instant messages, text messages, SMS messages, and social network messages, a third classifier for emails and faxes, a fourth classifier for video, etc.) or other contexts (e.g., different classifiers for different business departments, different product lines, different languages, etc.).

After the transcription phase 404, the training stage 402 may proceed to a segmentation phase 406 in which the system segments text transcripts based on the temporal and lexical features of the transcripts. In addition or alternatively, segmentation may be based on one or more of the other features discussed with respect to the text feature extractor 310 and segmentation engine 312 of FIG. 3 (e.g., syntactic features, audio or prosodic features, user features, and other low-level text features). From there, the segments can undergo a clustering phase 408 in which the system automatically clusters the segments based on semantic similarity or relatedness (e.g., LCS, Path Distance Similarity, Lexical Chains, Overlapping Glosses, Vector Pairs, HAL, LSA, LDA, ESA, PMI-IR, Normalized Google Distance, DISCO, variations of one or more of these semantic similarity measures, or other similarity measures quantifying similarity by the meaning of segments). In other embodiments, clustering may be based on different features discussed with respect to the segment feature extractor 314 (e.g., character-based lexical similarity, term-based lexical similarity, or other higher-level text features) and/or different clustering methods discussed with respect to the clustering engine 316 (e.g., partitional clustering, hierarchical clustering, density-based clustering, classification-based clustering, grid-based clustering, or other suitable clustering algorithm). In still other embodiments, clustering may be semi-supervised by seeding the clustering algorithm used in the clustering phase 408 with one or more predetermined cluster examples to increase the likelihood that the clustering algorithm outputs clusters similar to the predetermined clusters.

The training stage 402 may continue with a phase 410 for receiving a set of classifications (also referred to as labels throughout the present disclosure) for a subset of the clusters denoting whether a cluster is a waypoint or is not a waypoint. For example, an administrator (e.g., a human operator, a software agent trained from similar communication data, or a combination of both) can review the clusters of segments of each communication and label a subset of the clusters on the basis of a business objective or other predetermined criteria. These labeled clusters of segments can be utilized as training data samples for classifying segments in new communications as waypoints. Waypoints are metadata of a communication for summarizing, categorizing, labeling, classifying, or otherwise annotating sections of the communication that may be of particular relevance to a user. Waypoints can be represented as short descriptions, icons, or other user suitable interface elements to help users, upon selection of a waypoint, navigate quickly through a communication (e.g., an audio track, a text transcript, or other suitable representation) to the portion of the communication corresponding to the selected waypoint. The waypoints can also operate as features of a communication for data mining, reporting, and other analyses for historical data as well as new data as discussed in greater detail further below.

In some embodiments, the system can receive the classifications from a user via user interface provided by the system. The user interface may enable the user to label clusters on a per cluster basis, such as by presenting all of the segments of the training corpus belonging to a cluster and receiving labels (if any) for that cluster. Alternatively, or in addition, the user interface may enable the user to label segments on a per communication basis, such as by presenting an individual communication or a portion of the communication and annotations indicating the segments of the communication that may be associated with certain clusters and receiving labels (if any) for those clusters. For example, the user can label a segment of a first cluster in a first communication as a waypoint, and that label propagates to the portions of other communications belonging to the first cluster. The user can continue reviewing additional communications individually to label additional waypoints and validate or revise the output of the clustering phase 408. In some embodiments, whether labeling on a per cluster basis or on a per communication basis, the user interface can enable the user to edit clusters (e.g., add a segment to a cluster, delete a segment from a cluster, move a segment from one cluster to another, join multiple clusters, divide a single cluster into multiple clusters, etc.).

In some embodiments, the system can also receive the set of classifications via an automated process, such as by inputting the clusters determined during the clustering phase 408 into a machine learning classifier trained to identify waypoints in clusters. In some cases, the system can also combine manual and automatic processes, such as by running an automated process to generate a set of classifications and providing a user interface to refine the classifications.

The system can proceed to a modeling phase 412 in which the system generates a machine learning classifier from the set of classifications received at phase 410, such as by using one of the machine learning algorithms discussed with respect to the cluster feature extractor 318 or classification engine 320 of FIG. 3 (e.g., k-nearest neighbor, boosting, statistical methods, perceptrons, neural networks, decision trees, random forests, SVMs, etc.).

After completion of the training stage 402, the system can process new communications in the segment labeling stage 420 beginning with speech-to-text transcription 422 of audio data within the new communications (e.g., unclassified historical data; historical data classified using different features, different labels and/or different machine learning classifiers; new data; etc.) and segmentation 424 of the new text transcript. The speech-to-text transcription 422 and segmentation 424 in the segment labeling stage 420 may use the same or similar underlying technology as the speech-to-text transcription 404 and segmentation 406 of the training stage 402, respectively, but may differ in architecture and other characteristics to handle different workloads, security measures, and other issues distinguishing a development or testing environment from a production environment.

The segment labeling stage 420 may continue to classification 426 in which the system can automatically (e.g., without input from a human administrator) classify one or more segments of a communication as one or more waypoints utilizing the machine learning classifier trained during the modeling stage 412. Tables 2-4 provide example outputs of a machine learning classifier that identifies portions (e.g., words, segments, sentences, paragraphs, sections, etc.; referred to in the Tables as the Section Identifier or Section ID) of the text (referred to in the Tables as the Transcript Text) of the communications (referred to in the Tables as the Communication Identifier or "Comm. ID"). For instance, Table 2 sets forth examples of the parts of various communications that the machine learning classifier identifies as a callback waypoint (e.g., a waypoint corresponding to portions of a communication relating to the CSR or the customer requesting for and/or providing for callback information in the event of a dropped call).

TABLE 2

Examples of Callback Waypoints

| Comm. ID | Section ID | Transcript Text |
| --- | --- | --- |
| 104854 | 8 | THANK_YOU AND UH COULD I ALSO GET A PHONE_NUMBER FROM YOU IN CASE WE GET DISCONNECTED |
| 112039 | 12 | OKAY AND LET_ME_SEE_HERE AND WHAT'S A GOOD CALLBACK_NUMBER JUST IN CASE WE GET DISCONNECTED |
| 112039 | 39 | OKAY I CAN DEFINITELY DO THAT WHAT'S A GOOD EMAIL TO REACH YOU AT |
| 112441 | 9 | THANK_YOU AND CAN I PLEASE GET A CALLBACK_NUMBER JUST IN CASE WE'RE DISCONNECTED |
| 120852 | 21 | ALRIGHT CAN I GET A CALLBACK_NUMBER FOR YOU _NAME_ JUST IN CASE WE'RE DISCONNECTED |
| 125849 | 8 | MY NAME'S _NAME_ ALRIGHT _NAME_ AND CAN I GO_AHEAD_AND JUST CONFIRM THE CALLBACK_NUMBER FOR YOU |
| 132905 | 10 | YES OR BILL GREAT EXCELLENT THANK_YOU HOW WOULD YOU LIKE TO BE INTRODUCED OR AND IN CASE WE DO GET DISCONNECTED WHAT'S A GOOD CALLBACK_NUMBER FOR YOU PLEASE |
| 135701 | 10 | OKAY JUST A HERE ALRIGHT CAN I GET YOUR PHONE_NUMBER |
| 135722 | 5 | OKAY _LOCATION_ AND CAN I GET A CALLBACK_NUMBER JUST IN CASE WE GET DISCONNECTED |
| 140225 | 9 | _NAME_ AND JILLIAM MAY I ALSO HAVE YOUR ACME ID |
| 140225 | 11 | AND A CALLBACK_NUMBER |
| 140225 | 77 | YOU DON'T WORRY I'LL HELP YOU FIGURE THIS OUT UH LET'S SEE OKAY CAN I GET YOUR LANDLINE NUMBER |
| 142944 | 28 | OKAY AND DO YOU HAVE A GOOD CALLBACK_NUMBER JUST IN CASE WE GET DISCONNECTED YEAH_NUMBER__NUMBER_ AND ASK FOR BIG _NAME_ |
| 152110 | 3 | YES IT IS WONDERFUL UH QUESTION CAN I GET A CALLBACK_NUMBER FROM YOU REAL QUICK JUST IN CASE WE GET DISCONNECTED |

Table 3 sets forth examples of the portions of various communications that the machine learning classifier identifies as a reason request waypoint (e.g., a waypoint corresponding to portions of a communication relating to the reason for a customer initiating a telephone call or other communication).

TABLE 3

Examples of Waypoints for Requesting Reasons for Initiating Telephone Call

| Comm. ID | Section ID | Transcript Text |
| --- | --- | --- |
| 112441 | 11 | THANK_YOU AND PLEASE GIVE ME A BRIEF DESCRIPTION OF THE REASON FOR YOUR CALL AND I'LL GET YOU TO THE APPROPRIATE DEPARTMENT |
| 123102 | 13 | ALRIGHT _NAME_ AND CAN I GET A BRIEF DESCRIPTION FOR THE REASON OF YOUR CALL MA'AM |
| 130258 | 10 | THANK_YOU IF YOU COULD PLEASE GIVE ME A BRIEF DESCRIPTION OF THE REASON FOR YOUR CALL I WILL DIRECT YOU TO THE MOST APPROPRIATE SUPPORT RESOURCE |
| 131922 | 8 | THANK_YOU AND IF I CAN HAVE A REASON FOR YOUR CALL SO I CAN DIRECT YOU TO THE APPROPRIATE SUPPORT RESOURCE |
| 131922 | 27 | OH YES OKAY AND UH WHAT ISSUE ARE YOU HAVING TODAY |
| 132905 | 5 | THANK_YOU _NAME_ AND HOW MAY I DIRECT YOUR CALL I HAVE YOUR LAPTOP PULLED UP HERE UH ARE YOU STILL HAVING AN ISSUE WITH YOUR USB OR |
| 142102 | 7 | HEY OKAY THAT'S GOOD CAN I PLEASE GET A BRIEF DESCRIPTION OF WHY YOU'RE CALLING ACME |
| 142944 | 12 | OKAY SO YOU'RE HAVING ISSUES WITH AN ACME COMPUTER |
| 143107 | 10 | EXCUSE ME WHAT IS THE REASON FOR THE CALL TODAY |
| 143446 | 6 | AND A BRIEF DESCRIPTION FOR THE REASON OF YOUR CALL THAT WAY I CAN GET YOU WHERE YOU NEED TO BE |
| 145423 | 8 | AND COULD I PLEASE GET A BRIEF DESCRIPTION OF THE ISSUE YOU'RE HAVING TODAY AND I WILL DIRECT YOU TO YOUR BEST SUPPORT OPTIONS |
| 150310 | 15 | OH OKAY GO_AHEAD_AND GIVE ME A BRIEF DESCRIPTION OF AS TO WHY YOU'RE CALLING _NAME_ |
| 152302 | 32 | OKAY YEAH IT'S THIS IS THE RIGHT PLACE OKAY AND YOU GIM ME YES I HAVE IT I WAS MAKING SURE I HAD THE RIGHT DEVICE UP CAN YOU GIVE ME A BRIEF DESCRIPTION OF REASON YOU CALLED US |

Table 4 sets forth examples of the portions of various communications that the machine learning classifier identifies as a wireless waypoint (e.g., a waypoint corresponding to portions of a communication relating to problems with wireless connections).

TABLE 4

Examples of Waypoints for Customer's Wireless Issues

| Comm. ID | Section ID | Transcript Text |
| --- | --- | --- |
| 100536 | 34 | OKAY SO IT JUST TELLS YOU THAT YOU'RE UNABLE TO CONNECT |
| 104843 | 119 | WHAT IF YOU SWIPE THIS WHAT DOES IT SAY DON'T DO THAT OKAY PLUG IT BACK IN SHE SAID OKAY NOW CAN YOU CONNECT TO WI-FI YEAH YOU SHOULD BE ABLE TO RIGHT WAIT WHAT CAN YOU CONNECT TO WI-FI |
| 112039 | 16 | ALRIGHT UH IT WI-FI JUST DOESN'T CONNECT TO WI-FI |
| 112039 | 17 | IT DOESN'T CONNECT TO WI-FI OKAY UH LEM ME SEE HERE AND UH DO YOU HAVE UH OTHER DEVICES ARE ABLE TO CONNECT UH I_AM_SORRY UNBELIEVABLE I_AM_SORRY SAY THAT AGAIN NOW |
| 112039 | 18 | NO PROBLEM UH I WAS JUST ASKING UH IF YOU HAD ANY OTHER DEVICES THAT CONNECT TO WI-FI |
| 135701 | 39 | NOT VALID UNINTELLIGIBLE JUST WHATEVER IT WAS SAYING BEFORE GIVE IT A CAUSE IT'S JUST IT'S LOOKING FOR AND IT'S NOT ABLE TO FIND IT AND SO IT'S GOING_TO SAY UNABLE TO SIGN_IN UNABLE TO CONNECT OR WHAT WHATEVER BUT |
| 191455 | 16 | MY ISSUE IS I HAVE AN IPAD UH IT'S AND IPAD_TWO AND UH IT SEEMS THAT ALL OF A SUDDEN I'M NOT ABLE TO CONNECT TO A WIRELESS TO THE WIRELESS_NETWORK I ALSO HAVE AN IPHONE AND I'M I'M NOT HAVING ANY PROBLEMS WITH THAT AND I HAVE |

TABLE 4-continued

Examples of Waypoints for Customer's Wireless Issues

| Comm. ID | Section ID | Transcript Text |
|---|---|---|
|  |  | A LAPTOP WHICH IS NOT IT'S IT'S IT'S A UH IT'S NOT AN ACME PRODUCT IT'S IT'S AN OLDER LAPTOP BUT IT'S ALSO WIRELESS AND I'M NOT HAVING ANY PROBLEMS WITH THAT SO I DON'T THINK IT'S A CONNECT I_MEAN I DON'T THINK IT'S A UNINTELLIGIBLE I DON'T KNOW WHAT IT IS BUT I HAVEN'T BEEN ABLE TO CONNECT FOR LIKE _NUMBER_ DAYS |
| 215857 | 8 | UH I'M NOT ABLE TO CONNECT THE SOFTWARE ON ACME DOESN'T THERE S AN ADDRESS BAR THAT USED TO APPEAR IT'S NOT APPEARING OKAY SO YOU SAID THAT YOU'RE UNABLE TO CONNECT YOUR PRODUCT |

Figure 5:
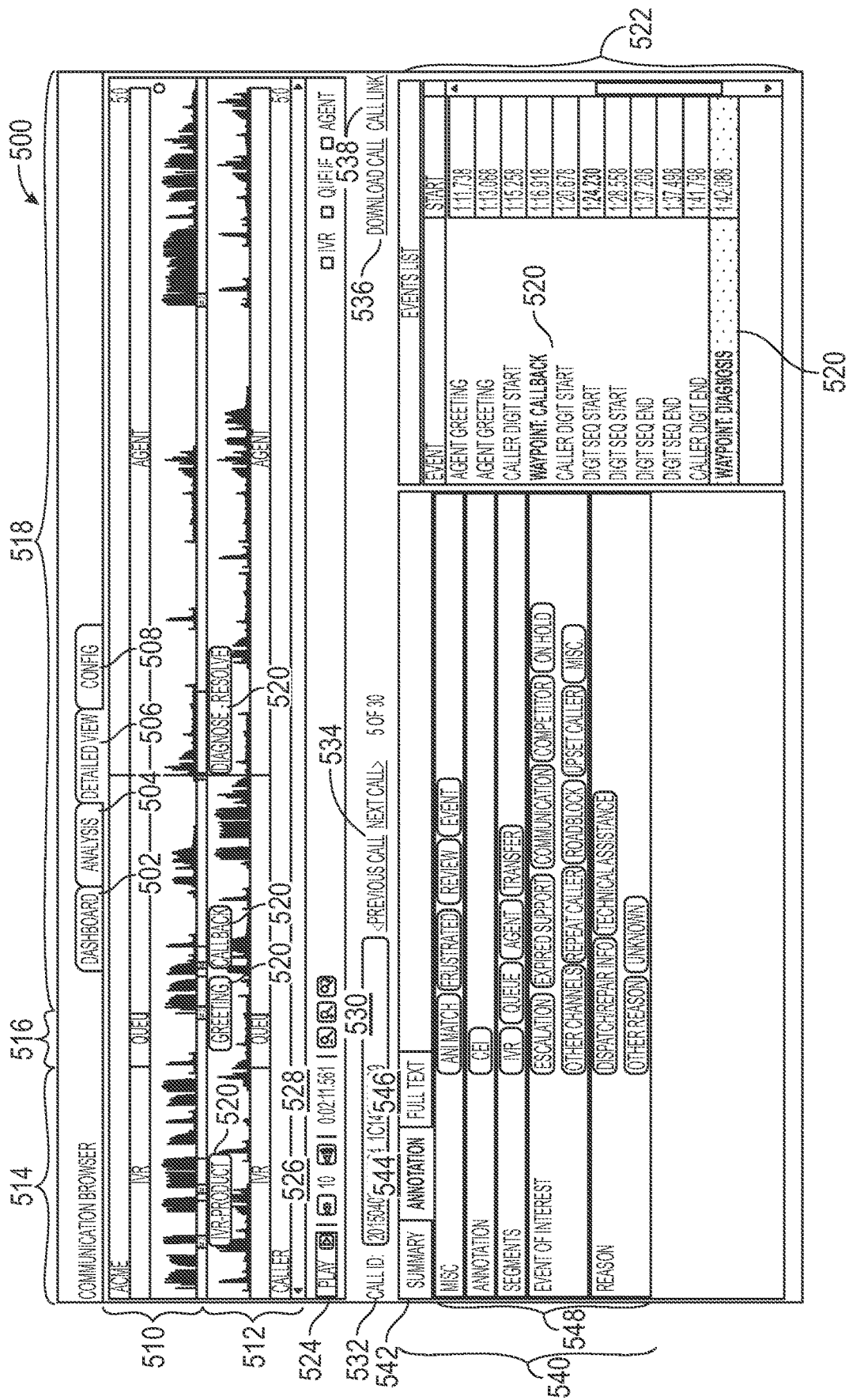
FIGS. 5-7 illustrate examples of graphical user interfaces for a contact center analysis system in accordance with an embodiment.
Figure 6:
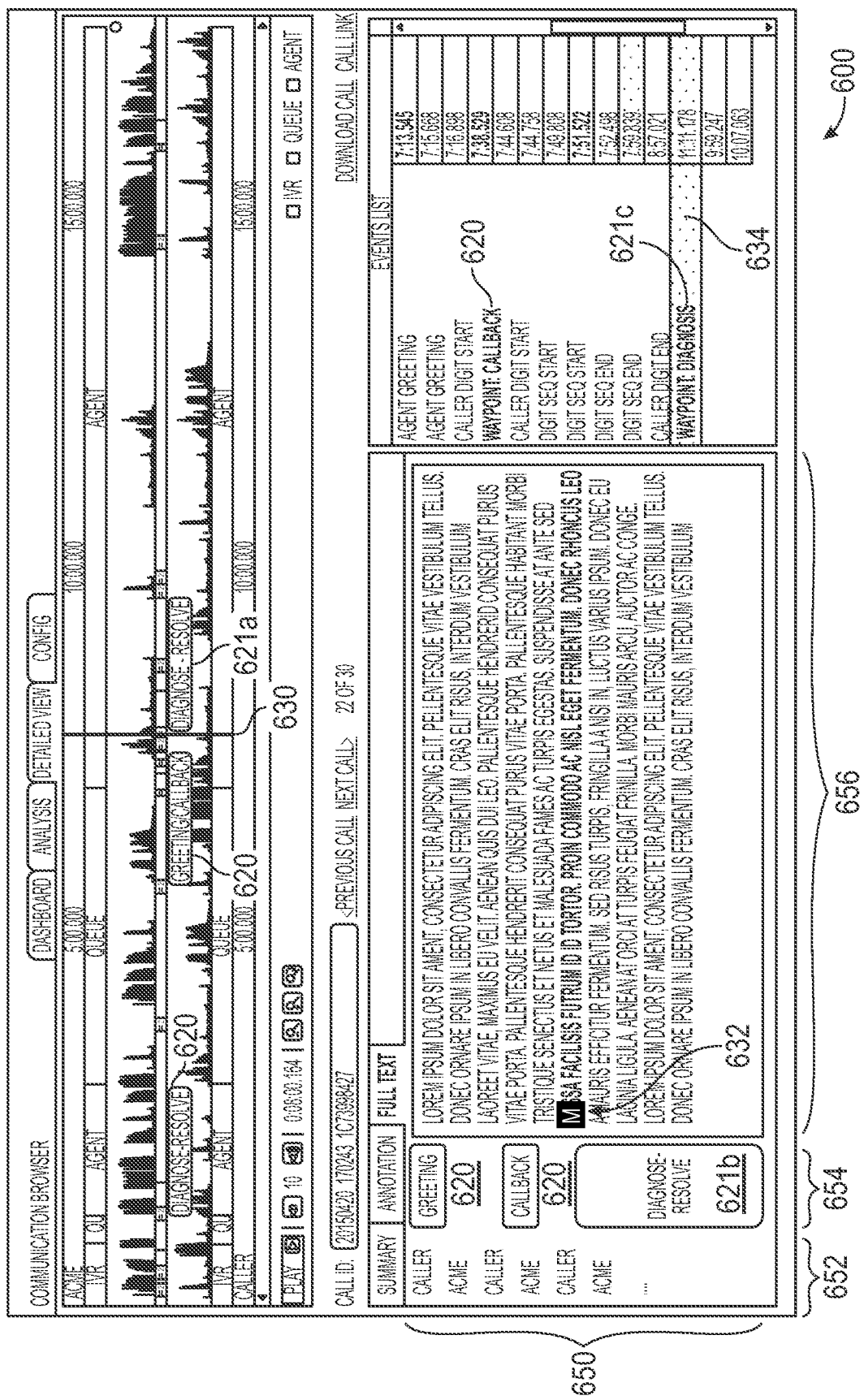
Figure 7:
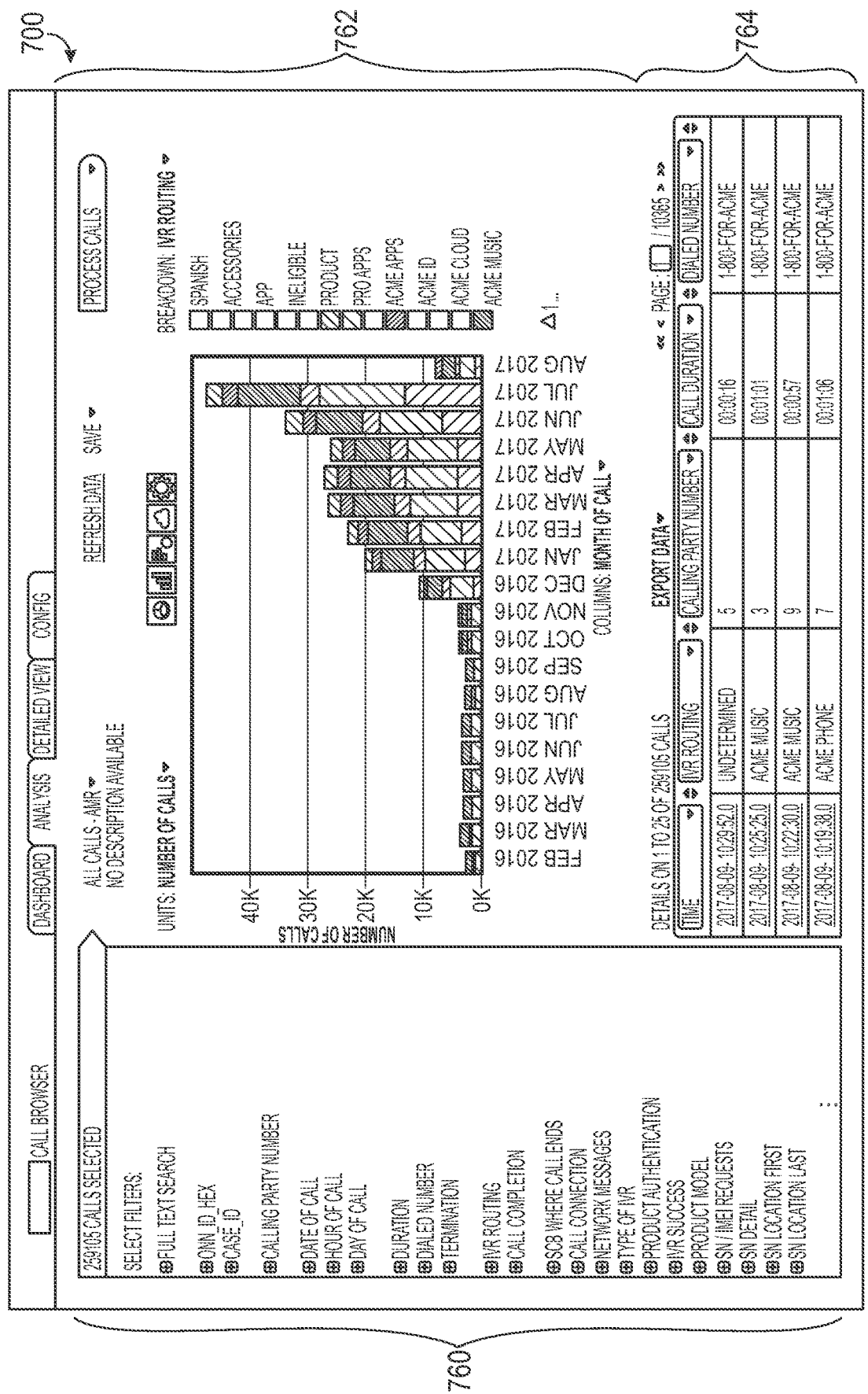

FIGS. 5-7 show examples of graphical user interfaces (GUIs) for a contact center analysis system (e.g., the contact center analysis system 250 of FIG. 2 or the contact center analysis system 300 of FIG. 3). In particular, FIG. 5 shows a graphical user interface 500 of a detailed view of a communication. Although the graphical user interfaces 500, 600, and 700 are examples of web interfaces (e.g., an application accessible via a web browser), other embodiments may employ other kinds of interfaces, such as a standalone desktop/server application interface, a mobile app interface, or other suitable interface for enabling users to interact with the contact center analysis system.

In this example, the graphical user interface 500 includes primary navigation tabs 502, 504, 506, and 508 at the top of the GUI 500; audio interface windows 510 and 512 below the navigation bar; waypoints 520 overlaying the audio interface windows 510 and 512 and event list window 522; user interface elements 524, 526, 528, 530, 532, 534, 536, and 538 below the audio interface windows; a communication content window 540 including secondary navigation tabs 542, 544, and 546, and a communication content pane 548 below the user interface elements and on the left side of the GUI 500; and the event list window 522 below the user interface elements and on the right side of the GUI 500. Selection of one of the primary navigation tabs 502, 504, 506, and 508 can cause the GUI to display a set of windows for providing various functionality of the contact center analysis system corresponding to the selected tab. FIG. 5 shows that a user has selected the Detailed View navigation tab 506, and in response, the contact center analysis system has displayed a detailed view of a communication. The Dashboard tab 502 can be associated with a dashboard view of the contact center analysis system, such as for providing monitoring and system health information, alerts and notifications, and the like. The Analysis tab 504 can be associated with an aggregate view of the communications flowing through the contact center analysis system, and is discussed in further detail with respect to FIG. 7 and elsewhere in the present disclosure. The Configuration tab 508 can be associated with an interface for an administrator of the contact center management to set personal preferences, account information, and the like.

The audio interface windows 510 and 512 can each include an audio wave representation of the speech (e.g., the vertical axis representing intensity or sound pressure and the horizontal axis representing time) of a CSR and a customer, respectively. As shown in FIG. 5, portions of an audio wave that are close to zero can correspond to when a user is not speaking or otherwise not making noise and segments greater than zero or less than zero can correspond to when the user is speaking or otherwise making noise. In addition to representing time, the horizontal axis of the audio interface windows 510 and 512 can also divide the communication as it flows through the contact center analysis system, which in this example includes a division 514 for when the communication was initiated by a customer and fielded by an IVR system (e.g., the IVR system 140 of FIG. 1), a division 516 for when the customer was placed on hold and queued until a CSR became available, and a division 518 when the customer interacted with the CSR. In other embodiments, detailed view of a communication can also chain communications regarding related subject matter from the same customer from other channels (e.g., email, text message, fax, etc.).

Overlaying the audio interface windows 510 and 512 are waypoints 520 that can represent portions of the audio wave that may be of particular relevance to a contact center administrator, the CSR, or other user. Users can also quickly navigate to a particular waypoint by selecting that waypoint from the audio interface windows 510 and 512, the event list window 522, or the full text pane 666 as discussed further in FIG. 6 and elsewhere in the present disclosure.

The GUI 500 can also include a number of user interface elements for controlling various aspects of the detailed view of a communication, such as media controls 524 (e.g., play, stop, pause, fast-forward, rewind, etc.) for playback of media (e.g., audio, video, text-to-speech reading, etc.), volume controls 526, a current media position counter 528, display controls 530 for the GUI 500 and/or media, a current communication identifier 532, navigation controls 534 for reviewing the previous communication or the next communication, a communication downloader 536, and a link 538 for sharing the communication, among others.

The communication content window 540 can provide a number of panes for displaying different representations of a communication, such as a summary pane 542, an annotation pane 544, and a full text pane 546. The summary pane 542 can provide a brief description of the content of the communication and other information regarding the communication (e.g., CSR information for the CSR fielding the communication, customer information, the time and date of the communication, the duration of the communication, etc.).

In this example, a user has selected the annotation pane 544 to review and/or update metadata, tags, labels, and the like for the communication (e.g., other than the waypoints 520). The other metadata can include information logged by a PBX (e.g., the PBX 130 of FIG. 1), an ACD (e.g., the ACD 132), a CTI (e.g., the CTI 134), an IVR system (e.g., the IVR system 140), a web server (e.g., the web server 110), an e-mail server (e.g., the e-mail server 112), a directory server (e.g., the directory server 116, a chat server (e.g., the chat server 118), or other component of an enterprise network (e.g., the enterprise network 102). The other metadata can also include information input by a user, such as the CSR fielding the communication or a contact center administrator reviewing the communication, regarding events of interest occurring during the course of the communication, the reason for the communication, the resolution reached, and the like.

The full text pane 546 can provide the text transcript of the communication, and is discussed in further detail with respect to FIG. 6 and elsewhere in the present disclosure. In this example, the event list window 522 also includes the annotations in the annotation pane 544, or other automatically detected events not in bold to differentiate from the bolded waypoints 520. The event list window 522 also includes timestamps associated with the waypoints 520 and other events. In some embodiments, the waypoints 520 in the event list window 522 can be ordered sequentially based on the timestamps.

FIG. 6 shows an example of a graphical user interface 600 that can be a part of the same or a similar interface as the graphical user interface 500 of FIG. 5. In this example, the primary difference between the GUIs may be that the full text pane 650 has been selected in the GUI 600 instead of the annotation pane 544 in the GUI 500. The full text pane 650 can include a section 652 for identifying the user uttering the corresponding text in section 656, which can be text translated from the speech associated with the audio wave representations of the audio interface windows 510 and 512 of FIG. 5. The full text pane 650 can also include a section 654 for indicating which portions of the text in section 656 map to waypoints 620.

FIG. 6 also shows that the user has selected a specific waypoint from one of the interface windows of the GUI 600 (e.g., the waypoint 621a overlaying the audio interface windows, the waypoint 621b in the full text pane 650, or the waypoint 621c in the event list window) to cause the GUI 600 to update one or more of the other interface windows to reflect the selection of the specific waypoint. That is, selecting the waypoint 621a from the audio interface windows can cause a text cursor 632 or other graphical element to move to the portion of the text transcript corresponding to the waypoint 621b and/or a waypoints cursor 634 to move to the waypoint 621c. Similarly, selecting the waypoint 621b from the full text pane 650 can cause an audio cursor 630 to move to the portion of the audio wave corresponding to the waypoint 621a and/or the waypoint cursor 634 to move to the waypoint 621c; and selecting the waypoint 621c from the event list window can cause the audio cursor 630 to move to the portion of the audio wave corresponding to the waypoint 621a and/or the text cursor 632 to move to the portion of the text transcript corresponding to the waypoint 621b.

FIG. 7 shows an example of a graphical user interface 700 that can be a part of the same or a similar interface as the graphical user interface 500 of FIG. 5 and/or the graphical user interface 600 of FIG. 6 (e.g., the GUI 700 can correspond to the Analysis tab 504 of FIG. 5). The GUI 700 can provide a view for interacting with multiple communications flowing through a contact center analysis system (e.g., the contact center analysis system 250 of FIG. 1 or the contact center analysis system 300 of FIG. 3), and may include a communications selector interface window 760, a data visualization window 762, and a selected communications interface window 764.

The communications selector interface window 760 can enable an administrator of the contact center analysis system to select some or all communications flowing through the contact center analysis system for review and analysis. The administrator can sort, filter, or otherwise organize a collection of communications according to various criteria, such as a keyword search on the text of the communications; case number; CSR information; customer information (e.g., area code, geographic region, and other location information; age, gender, years of education, and other demographic information); time and date of the communications; duration of the communications; communication channel of the communications; outcomes of the communications (e.g., whether the customer's issue was resolved or unresolved, the total number of communications to resolve the customer's issues, total length of time spent to resolve the customer's issue, and other information relating to the outcome); reason for the communications (e.g., business department contacted, product line, and other information relating to the source of the customer's issue); events or waypoints included in or excluded from the communications; and other features and characteristics of communications discussed elsewhere in the present disclosure.

In some embodiments, the communications selector interface window 760 can also include various tools for analyzing the communication data, such as a structured query language (SQL) interface or other suitable interface for users to make ad-hoc queries for accessing the communication data; standard reports for various contact center metrics (e.g., queues, CSRs, customer interactions, campaigns, IVR scripts, lists, contacts, do-not-calls, worksheets, etc.); and tools for generating custom reports (e.g., templates, data fields, sorting/filtering criteria (including time and/or date sorting/filtering), etc.). For example, an administrator may want insight on what seems to be angering customers. The administrator can use sudden changes in the audio intensity, specific phrases, or other features in the communication data as a cue for customer anger and review waypoints (or lack of waypoints) proximate to these moments to understand potential sources of customer dissatisfaction and develop a strategy for de-escalating such situations, provide CSRs with more training regarding the subject matter of these waypoints, or take other appropriate measures. One of ordinary skill in the art will understand that numerous other analyses can be conducted from communication data injected with waypoints and these few examples by no means limit the scope of the present disclosure.

In some embodiments, the contact center analysis system can also support various statistical analyses of communications. For example, the contact center analysis system can determine the total number of communications including or excluding certain waypoints on a daily, weekly, monthly, or other periodic basis. As another example, the contact center analysis system can audit new CSRs (e.g., newly employed within the past six months) to ensure that a certain sequence of waypoints occur in the new CSR's communications with customers. As yet another example, the contact center analysis system can identify the volume of communications for each communication channel for new product releases for the past 5 years by identifying the number of communications received over the past 4 years that include a waypoint related to the product. These statistics, and numerous other statistics and combinations of statistics capturable by the contact center analysis system, can be associated with visual elements that the contact center analysis system can render within the data visualization window 762.

The selected communications interface window 764 can display the communications the administrator selected from the communications selector interface window 760. The administrator can obtain a detailed view of individual communications of a collection, such as the graphical user interfaces 500 of FIG. 5 or 600 of FIG. 6, via the individual communication selector interface window 764.

Figure 8:
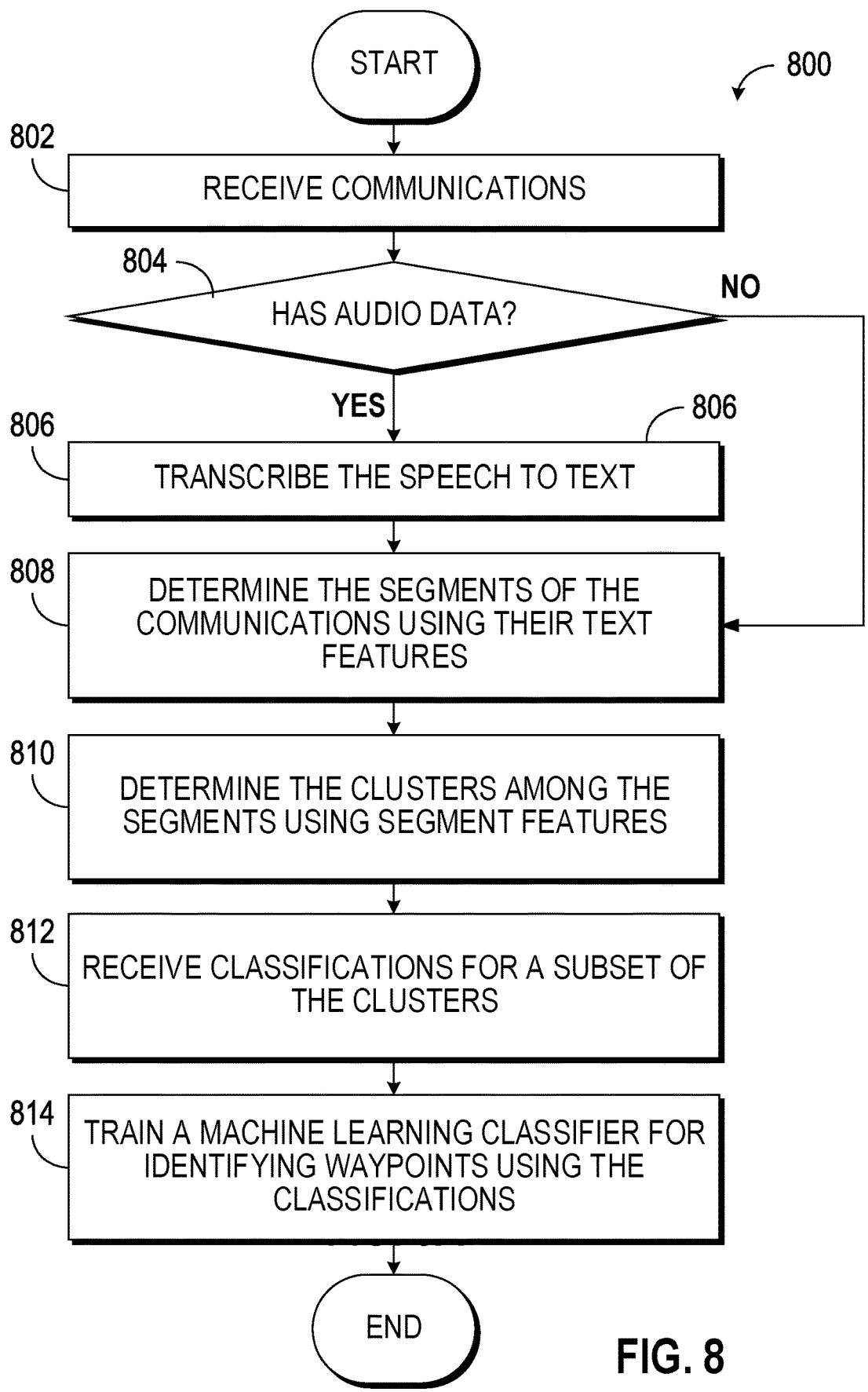
FIG. 8 illustrates an example of a process for training a machine learning classifier to identify waypoints in communications in accordance with an embodiment.

FIG. 8 shows an example of a process 800 for training a machine learning classifier to identify waypoints in communications. An enterprise network (e.g., the enterprise network 102 of FIG. 1); a component or components of the enterprise network (e.g., the call recorder 138, the IVR system 140, the voice recorder 146, the web server 110, application server 150, and database server 114 of FIG. 1, etc.); a contact center analysis system (e.g., the contact center analysis system 250 of FIG. 2; the contact center analysis system 300 of FIG. 3; etc.); a component or components of a contact center analysis system (e.g., the communication capturing system 272 and event processors 274 of FIG. 2; the application layer 304; etc.); a computing device (e.g., computing system 1000 of FIG. 10); or other system may perform the process 800. The process 800 may begin at step 802, in which one of the above-mentioned systems receives communication data. The communication data can include audio from telephones, voicemails, or videos; text data from speech-to-text translations, emails, live chat transcripts, instant messages, SMS text messages, social network messages, etc.; combinations of media; or other electronic communication.

At decision point 804, the system can determine whether the communication data includes audio data. If so, at step 806, the system can analyze the audio data to identify portions of the audio data including speech and transcribe the speech to text. If the communication data does not include audio data or after transcribing the speech to text at step 806, the process 800 can proceed to step 808 in which the system can segment the communication data according to various features of the communication data, including temporal features, lexical features, semantic features, syntactic features, prosodic features, user features, and other features or characteristics discussed elsewhere in the present disclosure. In an embodiment, the system segments the communications using temporal features and lexical features. Segments can be parts of speech, a specified number of words or n-grams, sentences, specified number of sentences, paragraphs, sections, or other suitable set of words or n-grams.

The process 800 can proceed to step 810 in which the system clusters the segments according to various similarity measures, such as character-based measures, term-based measures, corpus-based measures, semantic network-based measures, and combinations of these measures. In an embodiment, the system clusters segments according to semantic similarity. The computing system can use various clustering techniques, such as partitional clustering, hierarchical clustering, density-based clustering, classification-based clustering, grid-based clustering, or variations of these techniques.

At step 812, the system can receive a set of classifications for a subset of the clusters. That is, if the system has determined that the segments from multiple communications can be divided into N clusters, there may only be some number M<N of those clusters that actually represent waypoints relating to a business objective, target for improvement, audio browsing aid, or other predetermined criteria. The classification labels for those M clusters represent waypoints to be trained. In addition, the unlabeled clusters can be helpful for some machine learners to identify clusters that are not waypoints. In some embodiments, the system can include a user interface that presents the clusters determined within step 810 and enables a user to label certain clusters as waypoints depending on the user's objective. For example, the user may want to be able to jump quickly into portions of communications relating to a CSR's diagnosis of a customer's problem (e.g., a diagnosis waypoint) and the resolution of that problem (e.g., a resolution waypoint). The user can review the clusters on a per cluster basis by receiving all of the segments constituting a cluster and tagging the cluster a diagnosis waypoint or a resolution waypoint as appropriate. Alternatively, or in addition, the user can review the clusters on a per communication basis by receiving a communication or a portion of a communication and annotations indicating the segments of the communication associated with clusters (if any) and tagging the clusters (if any) that are diagnosis waypoints or resolution waypoints. The manually labeled clusters, and in the case of some machine learners, the unlabeled clusters, constitute the training set.

In other embodiments, the system may use an automated process for preparing a training set. For example, the system may utilize a machine learning classifier that receives a cluster as an input and that may or may not output a label for that cluster depending on how the machine learning classifier has been trained. In still other embodiments, the system may use a combination of both manual and automated processes. For instance, the system may utilize an automated process for assigning labels to a subset of clusters and provide a user interface for correcting or refining the labels.

The process 800 may conclude at step 814 in which the system utilizes the classifications to train a machine learning classifier (distinct from the machine learning classifier of step 812) to be able to identify whether a particular segment is a specific waypoint or not a waypoint. The classifier may be derived using approaches such as those based on k-nearest neighbor, boosting, statistical methods, perceptrons, neural networks, decision trees, random forests, support vector machines (SVMs), or other machine learning algorithm.

Figure 9:
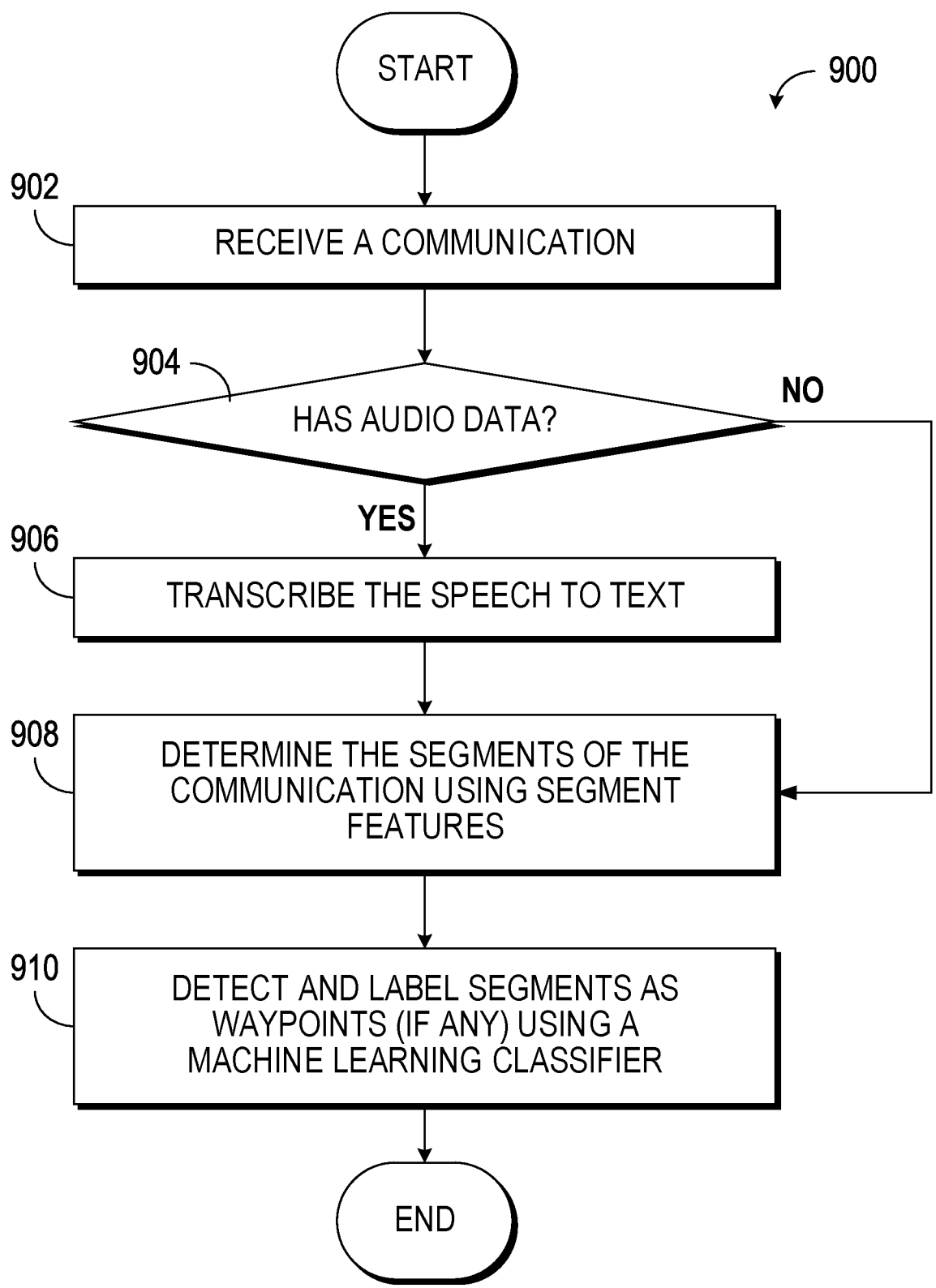
FIG. 9 illustrates an example of a process for identifying waypoints in a communication in accordance with an embodiment.

FIG. 9 shows an example of a process 900 for identifying waypoints in a communication. The process 900 can be performed by the same or a different system that performs the process 800 of FIG. 8 (e.g., an enterprise network, a contact center analysis system, a computing system, or a component or components of these systems). The process 900 can include a step 902 for receiving a communication, a decision point 904 for determining whether the communication includes audio data, a step 906 for transcribing speech in the audio data to text, and a step 908 for determining the segments of the communication based on the segments' temporal and lexical features. The step 902, decision point 904, and steps 906 and 908 may perform the same or similar operations as the steps 802, decision point 804, and steps 806, and 808 of FIG. 8, respectively. At step 910, the system may utilize a machine learning classifier (e.g., the machine learning classifier generated at step 814 of FIG. 8) to automatically detect and label segments (if any) of the communication as waypoints.

In some embodiments, the system can present the classifications in a graphical user interface including a detailed view of an individual communication for quick access and navigation to waypoints. For example, the graphical user interface may comprise an audio track and the classifications can operate as waypoints across the track, which upon a selection, can playback the portion of the audio (and/or jump to a portion of a text script and/or jump to a portion of an event list) corresponding to the selected waypoint. In addition or alternatively, the graphical user interface may include a text script and the classifications can operate as waypoints, which upon a selection, can jump to the portion of the script (and/or a portion of an audio track and/or a portion of an event list) corresponding to the selected waypoint. In addition or alternatively, the graphical user interface may include an event list and one or more of the events of the event list can operate as waypoints, which upon a selection, can jump to a portion of an event list (and/or a portion of an audio track and/or a portion of a text script) corresponding to the selected waypoint.

In some embodiments, the computing system can present the classifications in a graphical user interface including an aggregate view of communications. For example, a contact center administrator can filter, sort, or otherwise organize a collection of communications on the basis of a waypoint and playback that portion of each communication including audio and/or view that portion of each communication including text. The computing system can also tabulate, detect anomalies, conduct a/b analysis, predict future outcomes, discover hidden relationships, or otherwise mine communications that include a particular set of waypoints, that exclude a particular set of waypoints, or that both include a particular set of waypoints and exclude a particular set of waypoints.

Figure 10:
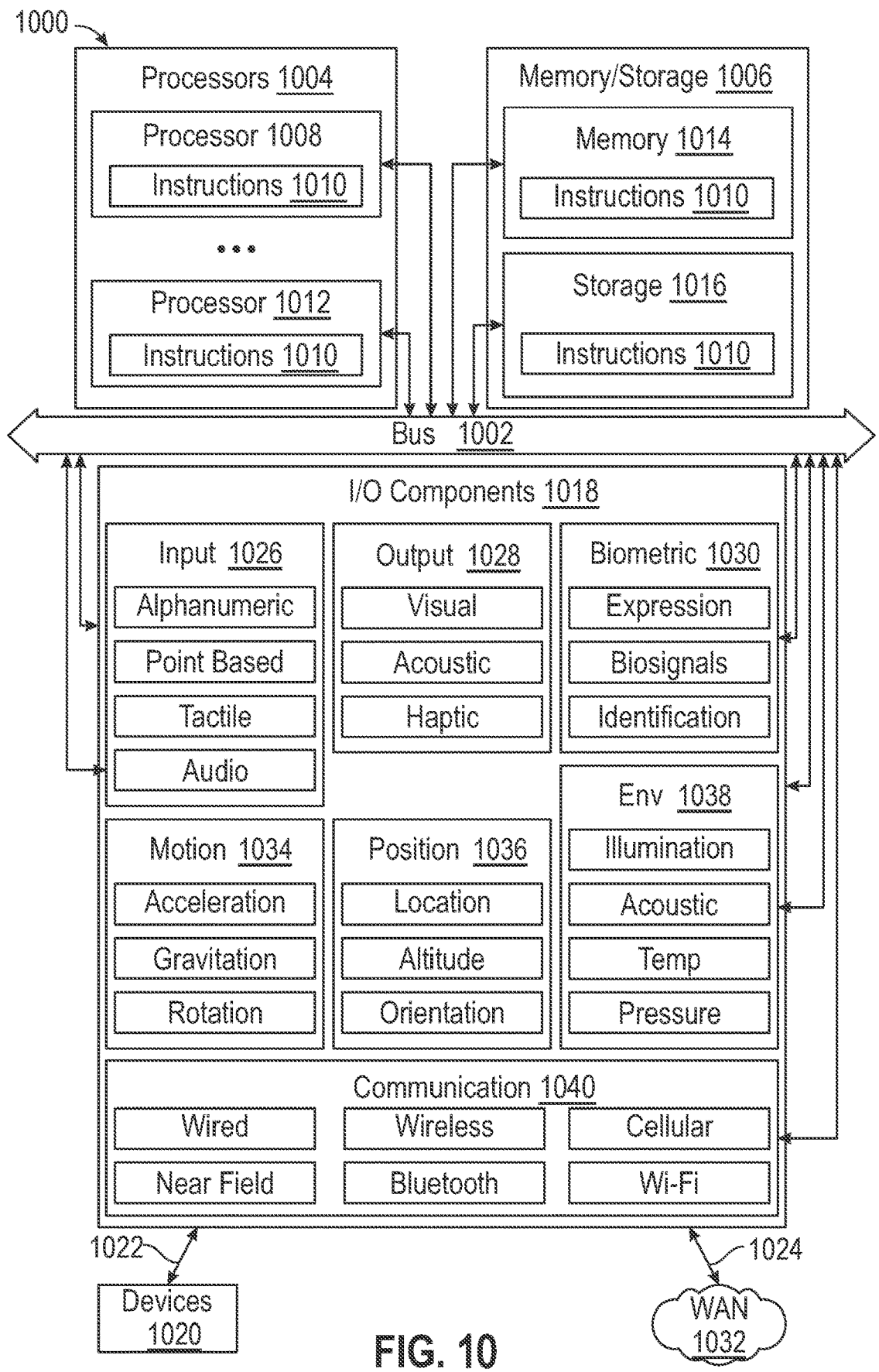
FIG. 10 an example of a computing system in accordance with an embodiment.

FIG. 10 shows an example of computing system 1000 in which various embodiments of the present disclosure may be implemented. In this example, the computing system 1000 can read instructions 1010 from a computer-readable medium (e.g., a computer-readable storage medium) and perform any one or more of the methodologies discussed in the present disclosure. The instructions 1010 may include software, a program, an application, an applet, an app, or other executable code for causing the computing system 1000 to perform any one or more of the methodologies discussed in the present disclosure. For example, the instructions 1010 may cause the computing system 1000 to execute the data flow diagram 400 of FIG. 4 and the process 800 of FIG. 8. In addition or alternatively, the instructions 1010 may implement some portions or every portion of the network environment 100 of FIG. 1, the network environment 200 of FIG. 2, the contact center analysis system 300 of FIG. 3, and the graphical user interfaces 500, 600, and 700 of FIGS. 5, 6, and 7, respectively. The instructions 1010 can transform a general, non-programmed computer, such as the computing system 1000 into a particular computer programmed to carry out the functions described in the present disclosure.

In some embodiments, the computing system 1000 can operate as a standalone device or may be coupled (e.g., networked) to other devices. In a networked deployment, the computing system 1000 may operate in the capacity of a server or a client device in a server-client network environment, or as a peer device in a peer-to-peer (or distributed) network environment. The computing system 1000 may include a switch, a controller, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any electronic device capable of executing the instructions 1010, sequentially or otherwise, that specify actions to be taken by the computing system 1000. Further, while a single device is illustrated in this example, the term "device" shall also be taken to include a collection of devices that individually or jointly execute the instructions 1010 to perform any one or more of the methodologies discussed in the present disclosure.

The computing system 1000 may include processors 1004, memory/storage 1006, and I/O components 1018, which may be configured to communicate with each other such as via bus 1002. In some embodiments, the processors 1004 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio frequency integrated circuit (RFIC), another processor, or any suitable combination thereof) may include processor 1008 and processor 1012 for executing some or all of the instructions 1010. The term "processor" is intended to include a multi-core processor that may comprise two or more independent processors (sometimes also referred to as "cores") that may execute instructions contemporaneously. Although FIG. 10 shows multiple processors 1004, the computing system 1000 may include a single processor with a single core, a single processor with multiple cores (e.g., a multi-core processor), multiple processors with a single core, multiple processors with multiples cores, or any combination thereof.

The memory/storage 1006 may include memory 1014 (e.g., main memory or other memory storage) and storage 1016 (e.g., a hard-disk drive (HDD) or solid-state device (SSD) accessible to the processors 1004, such as via the bus 1002. The storage 1016 and the memory 1014 store the instructions 1010, which may embody any one or more of the methodologies or functions described in the present disclosure. The instructions 1010 may also reside, completely or partially, within the memory 1014, within the storage 1016, within the processors 1004 (e.g., within the processor's cache memory), or any suitable combination thereof, during execution by the computing system 1000. Accordingly, the memory 1014, the storage 1016, and the memory of the processors 1004 are examples of computer-readable media.

As used in the present disclosure, "computer-readable medium" can mean an object able to store instructions and data temporarily or permanently and may include random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "computer-readable medium" may include a single medium or multiple media (e.g., a centralized or distributed database, or associated caches and servers) able to store the instructions 1010. The term "computer-readable medium" can also include any medium, or combination of multiple media, that is capable of storing instructions (e.g., the instructions 1010) for execution by a computer (e.g., the computing system 1000), such that the instructions, when executed by one or more processors of the computer (e.g., the processors 1004), cause the computer to perform any one or more of the methodologies described in the present disclosure. Accordingly, a "computer-readable medium" refers to a single storage apparatus or device, as well as "cloud-based" storage systems or storage networks that include multiple storage apparatus or devices. The term "computer-readable medium" excludes signals per se.

I/O components 1018 may include a wide variety of components to receive input, provide output, produce output, transmit information, exchange information, capture measurements, and so on. The specific I/O components included in a particular device will depend on the type of device. For example, portable devices such as mobile phones will likely include a touchscreen or other such input mechanisms, while a headless server will likely not include a touch sensor. In some embodiments, the I/O components 1018 may include input components 1026 and output components 1028. The input components 1026 may include alphanumeric input components (e.g., a keyboard, a touch screen configured to receive alphanumeric input, a photo-optical keyboard, or other alphanumeric input components), pointer-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like. The output components 1028 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth.

In some embodiments, the I/O components 1018 may also include biometric components 1030, motion components 1034, position components 1036, or environmental components 1038, among a wide array of other components. For example, the biometric components 1030 may include components to detect expressions (e.g., hand expressions, facial expressions, vocal expressions, body gestures, or eye tracking), measure bio-signals (e.g., blood pressure, heart rate, body temperature, perspiration, or brain waves), identify a person (e.g., voice identification, retinal identification, facial identification, fingerprint identification, or electroencephalogram-based identification), and the like. The motion components 1034 may include acceleration sensor components (e.g., accelerometer), gravitation sensor components, rotation sensor components (e.g., gyroscope), and so forth. The position components 1036 may include location sensor components (e.g., a Global Position System (GPS) receiver component), altitude sensor components (e.g., altimeters or barometers that detect air pressure from which altitude may be derived), orientation sensor components (e.g., magnetometers), and the like. The environmental components 1038 may include illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment.

Communication may be implemented using a wide variety of technologies. The I/O components 1018 may include communication components 1040 operable to couple the computing system 1000 to WAN 1032 or devices 1020 via coupling 1024 and coupling 1022 respectively. For example, the communication components 1040 may include a network interface component or other suitable device to interface with the WAN 1032. In some embodiments, the communication components 1040 may include wired communication components, wireless communication components, cellular communication components, Near Field Communication (NFC) components, Bluetooth components (e.g., Bluetooth Low Energy), Wi-Fi components, and other communication components to provide communication via other modalities. Devices 1020 may be another computing device or any of a wide variety of peripheral devices (e.g., a peripheral device coupled via USB).

Moreover, the communication components 1040 may detect identifiers or include components operable to detect identifiers. For example, the communication components 1040 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1040, such as location via Internet Protocol (IP) geolocation, location via Wi-Fi signal triangulation, location via detecting an NFC beacon signal that may indicate a particular location, and so forth.

In various embodiments, one or more portions of the WAN 1032 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi network, another type of network, or a combination of two or more such networks. For example, the WAN 1032 or a portion of the WAN 1032 may include a wireless or cellular network and the coupling 1024 may be a Code Division Multiple Access (CDMA) connection, a Global System for Mobile communications (GSM) connection, or another type of cellular or wireless coupling. In this example, the coupling 1024 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 1010 may be transmitted or received over the WAN 1032 using a transmission medium via a network interface device (e.g., a network interface component included in the communication components 1040) and utilizing any one of several well-known transfer protocols (e.g., HTTP). Similarly, the instructions 1010 may be transmitted or received using a transmission medium via the coupling 1022 (e.g., a peer-to-peer coupling) to the devices 1020. The term "transmission medium" includes any intangible medium that is capable of storing, encoding, or carrying the instructions 1010 for execution by the computing system 1000, and includes digital or analog communications signals or other intangible media to facilitate communication of such software.

Throughout this specification, plural instances may implement components, operations, or structures described as a single instance. Although individual operations of one or more methods are illustrated and described as separate operations, one or more of the individual operations may be performed concurrently. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

The embodiments illustrated of the present disclosure are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined by the appended claims, along with the full range of equivalents to which such claims are entitled.

As used in the present disclosure, the term "or" may be construed in either an inclusive or exclusive sense. Moreover, plural instances may be provided for resources, operations, or structures described in the present disclosure as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method, comprising:
   receiving first communications comprising a first dialog between persons;
   determining first segments of the first communications by segmenting the first communications using at least first temporal features and first lexical features that span one or more dialog turns associated with the first communications;
   determining clusters of the first segments by evaluating similarity among the first segments, thereby identifying the clusters of the first segments using density-based clustering;
   receiving waypoint classifications for a first subset of the clusters, by determining whether a particular cluster is a waypoint or is not a waypoint, wherein the receiving the waypoint classifications includes receiving a waypoint classification for a segment belonging to one of the clusters and propagating the waypoint classification to other segments belonging to the one of the clusters, wherein each of the waypoint classifications identifies that a respective cluster is a waypoint, and wherein each waypoint comprises metadata of a communication for summarizing, categorizing, labeling, classifying, or annotating sections of the communication;
   generating a training set comprising the first subset of the clusters and a second subset of the clusters, the second subset of the clusters being unlabeled clusters that are not waypoints;
   generating a machine learning classifier to identify waypoints in new communications by training the machine learning classifier from the training set, such that the machine learning classifier is trained to distinguish between segments that are waypoints and segments that are not waypoints and to classify the segments that are waypoints into classes corresponding to the waypoint classifications;
   receiving a second communication comprising a second dialog between persons;
   determining second segments of the second communication using at least second temporal features and second lexical features that span one or more dialog turns associated with the second communication;
   determining one or more waypoints for the second communication by inputting the second segments into the machine learning classifier;
   receiving a selection of a first waypoint of the one or more waypoints for the second communication; and
   moving a first cursor in a first display of a text transcript of the second communication to a portion of the first display of the text transcript of the second communication that corresponds to the first waypoint.

2. The computer-implemented method of claim 1, further comprising:
   determining that a communication of the first communications includes audio data; and
   transcribing speech included in the audio data to text.

3. The computer-implemented method of claim 1, further comprising:
   receiving a third communication that is one of a voicemail, a video, an e-mail, a live chat transcript, or a text message;
   determining third segments of the third communication; and
   determining one or more second waypoints for the third communication.

4. The computer-implemented method of claim 3, wherein determining the one or more second waypoints includes:
   inputting the third segments into a second machine learning classifier trained using third communications of a type of communication associated with the one of the voicemail, the video, the e-mail, the live chat transcript, or the text message.

5. The computer-implemented method of claim 1, further comprising:
   providing a user interface for classifying or not classifying the clusters on a per cluster basis.

6. The computer-implemented method of claim 1, further comprising:
   extracting at least one of semantic features, syntactic features, prosodic features, or user features associated with the first communications,
   wherein the first segments are further determined based on at least one of the semantic features, the syntactic features, the prosodic features, or the user features associated with the first communications.

7. The computer-implemented method of claim 1, wherein determining the clusters includes:
applying a clustering algorithm to the first segments using partitional clustering, hierarchical clustering, density-based clustering, or grid-based clustering.

8. The computer-implemented method of claim 7, further comprising:
seeding the clustering algorithm using one or more pre-determined cluster examples.

9. The computer-implemented method of claim 1, wherein the machine learning classifier is associated with a machine learning classification algorithm from a group comprising a nearest neighbor algorithm, a boosting algorithm, a statistical algorithm, a neural network, a random forest, and a support vector machine.

10. The computer-implemented method of claim 1, further comprising:
moving a second cursor of a second display of an audio wave representation of the second communication to a portion of the second display of the audio wave representation of the second communication that corresponds to the first waypoint.

11. The computer-implemented method of claim 10, further comprising:
moving a third cursor of a third display of an event list of the second communication to a portion of the third display of the event list of the second communication that corresponds to the first waypoint.

12. A computing system, comprising:
one or more processors;
memory including instructions that, upon execution by the one or more processors, cause the computing system to:
receive first communications comprising a first dialog between persons;
determine first segments of the first communications by segmenting the first communications using at least first temporal features and first lexical features that span one or more dialog turns associated with the first communications;
determine clusters of the first segments by evaluating similarity among the first segments, thereby identifying the clusters of the first segments using density-based clustering;
receive waypoint classifications for a first subset of the clusters, by determining whether a particular cluster is a waypoint or is not a waypoint, wherein the receiving the waypoint classifications includes receiving a waypoint classification for a segment belonging to one of the clusters and propagating the waypoint classification to other segments belonging to the one of the clusters, wherein each of the waypoint classifications identifies that a respective cluster is a waypoint, and wherein each waypoint comprises metadata of a communication for summarizing, categorizing, labeling, classifying, or annotating sections of the communication;
generate a training set comprising the first subset of the clusters and a second subset of the clusters, the second subset of the clusters being unlabeled clusters that are not waypoints;
generate a machine learning classifier to identify waypoints in new communications by training the machine learning classifier from the training set, such that the machine learning classifier is trained to distinguish between segments that are waypoints and segments that are not waypoints and to classify the segments that are waypoints into classes corresponding to the waypoint classifications;
receive a second communication comprising a second dialog between persons;
determine second segments of the second communication using at least second temporal features and second lexical features that span one or more dialog turns associated with the second communication;
determine one or more waypoints for the second communication by inputting the second segments into the machine learning classifier;
receive a selection of a first waypoint of the one or more waypoints for the second communication; and
move a first cursor in a first display of a text transcript of the second communication to a portion of the first display of the text transcript of the second communication that corresponds to the first waypoint.

13. The computing system of claim 12, wherein the instructions upon execution further cause the computing system to:
provide a user interface for classifying or not classifying the clusters on a per communication basis.

14. The computing system of claim 12, wherein the instructions upon execution further cause the computing system to:
receive a third communication associated with a second context that differs from a first context associated with the first communications and the second communication; and
determine one or more second waypoints for the third communication by inputting the third communication into a second machine learning classifier trained using communications associated with the second context.

15. The computing system of claim 14, wherein the second context differs from the first context based on at least one of a type of a communication, a business department associated with a communication, a product associated with a communication, a language associated with a communication, or an a/b testing group associated with a communication.

16. A non-transitory computer-readable storage medium including instructions that, upon execution by one or more processors of a computing system, cause the computing system to:
receive first communications comprising a first dialog between persons;
determine first segments of the first communications by segmenting the first communications using at least first temporal features and first lexical features that span one or more dialog turns associated with the first communications;
determine clusters of the first segments by evaluating similarity among the first segments, thereby identifying the clusters of the first segments using density-based clustering;
receive waypoint classifications for a first subset of the clusters, by determining whether a particular cluster is a waypoint or is not a waypoint, wherein the receiving the waypoint classifications includes receiving a waypoint classification for a segment belonging to one of the clusters and propagating the waypoint classification to other segments belonging to the one of the clusters, wherein each of the waypoint classifications identifies that a respective cluster is a waypoint, and wherein each waypoint comprises metadata of a communication for summarizing, categorizing, labeling, classifying, or annotating sections of the communication;

generate a training set comprising the first subset of the clusters and a second subset of the clusters, the second subset of the clusters being unlabeled clusters that are not waypoints, generate a machine learning classifier to identify waypoints in new communications by training the machine learning classifier from the training set, such that the machine learning classifier is trained to distinguish between segments that are waypoints and segments that are not waypoints and to classify the segments that are waypoints into classes corresponding to the waypoint classifications;

receive a second communication comprising a second dialog between persons;

determine second segments of the second communication using at least second temporal features and second lexical features that span one or more dialog turns associated with the second communication;

determine one or more waypoints for the second communication by inputting the second segments into the machine learning classifier;

receive a selection of a first waypoint of the one or more waypoints for the second communication; and move a first cursor in a first display of a text transcript of the second communication to a portion of the first display of the text transcript of the second communication that corresponds to the first waypoint.

17. The non-transitory computer-readable storage medium of claim 16, wherein the instructions upon execution further cause the computing system to:
input the clusters into a second machine learning classifier that generates the waypoint classifications for the subset of the clusters.

18. The non-transitory computer-readable storage medium of claim 17, wherein the instructions upon execution further cause the computing system to:
provide a user interface for editing the waypoint classifications.

19. The non-transitory computer-readable storage medium of claim 16, wherein the instructions upon execution further cause the computing system to:
receive a selection of a first waypoint of the one or more waypoints for the second communication;

move a first cursor of a first representation of the second communication to a portion of the first representation of the second communication that corresponds to the first waypoint;

move a second cursor of a second representation of the second communication to a portion of the second representation of the second communication that corresponds to the first waypoint; and move a third cursor of a third representation of the second communication to a portion of the third representation of the second communication that corresponds to the first waypoint.

* * * * *

UNITED STATES PATENT AND TRADEMARK OFFICE
CERTIFICATE OF CORRECTION

PATENT NO. : 11,568,231 B2
APPLICATION NO. : 15/836102
DATED : January 31, 2023
INVENTOR(S) : Meteer et al.

It is certified that error appears in the above-identified patent and that said Letters Patent is hereby corrected as shown below:

In the Specification

In Column 29, Line 7, delete "764." and insert --760.-- therefor

In the Claims

In Column 39, Line 6, in Claim 16, delete "waypoints," and insert --waypoints;-- therefor Signed and Sealed this
Thirteenth Day of February, 2024

Katherine Kelly Vidal
*Director of the United States Patent and Trademark Office*